(12) United States Patent
Disberger et al.

(10) Patent No.: US 12,010,938 B2
(45) Date of Patent: Jun. 18, 2024

(54) AUTONOMOUS AGRICULTURAL SYSTEM

(71) Applicant: Great Plains Manufacturing, Inc., Salina, KS (US)

(72) Inventors: David Disberger, Salina, KS (US); Benjamin M Smith, Yorktown, VA (US); Rye DeGarmo, Salina, KS (US); Gregory W. Arnett, Garden City, MO (US); Craig A Reed, Salina, KS (US); Chris Coleman, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 626 days.

(21) Appl. No.: 17/150,785

(22) Filed: Jan. 15, 2021

(65) Prior Publication Data
US 2021/0212249 A1 Jul. 15, 2021

Related U.S. Application Data

(60) Provisional application No. 62/961,512, filed on Jan. 15, 2020, provisional application No. 63/121,724, filed on Dec. 4, 2020.

(51) Int. Cl.
*A01B 59/06* (2006.01)
*A01B 63/02* (2006.01)
(Continued)

(52) U.S. Cl.
CPC .......... *A01B 79/005* (2013.01); *A01B 59/068* (2013.01); *A01B 63/023* (2013.01);
(Continued)

(58) Field of Classification Search
CPC ......... E02F 3/76; E02F 3/7609; E02F 3/7613; E02F 3/7616; E02F 3/84; E02F 3/844; A01B 59/066
See application file for complete search history.

(56) References Cited

U.S. PATENT DOCUMENTS 3,432,184 A * 3/1969 Tweedy ................ A01B 63/111
280/481
4,944,354 A 7/1990 Langen et al.
(Continued)

FOREIGN PATENT DOCUMENTS

JP H0623404 U 3/1994
JP 2013226161 A 11/2013
(Continued)

OTHER PUBLICATIONS

PCT Search Report and Written Opinion dated May 4, 2021 for related PCT Patent Application No. PCT/US2021/013721, Filing Date Jan. 15, 2021, 10 pages.
(Continued)

*Primary Examiner* — Gary S Hartmann
(74) *Attorney, Agent, or Firm* — Hovey Williams LLP; Kameron D. Kelly

(57) ABSTRACT

An autonomous agricultural system comprising an implement configured to perform an agricultural operation. The system additionally comprises an autonomous power unit for autonomously propelling the implement. The system further comprises a coupling assembly configured to connect the implement to the power unit. The coupling assembly provides at least six degrees of freedom of movement between the implement and the power unit.

9 Claims, 28 Drawing Sheets

(51) Int. Cl.
*A01B 63/102* (2006.01)
*A01B 69/04* (2006.01)
*A01B 79/00* (2006.01)
*A01M 7/00* (2006.01)
*G05D 1/00* (2006.01)

(52) U.S. Cl.
CPC .......... *A01B 63/102* (2013.01); *A01B 69/008* (2013.01); *A01M 7/0089* (2013.01); *G05D 1/0088* (2013.01)

(56) References Cited

U.S. PATENT DOCUMENTS

| | | | | |
|---|---|---|---|---|
| 5,092,409 | A * | 3/1992 | Defrancq | A01B 63/108 91/363 R |
| 5,570,754 | A | 11/1996 | Stimson | |
| 6,311,784 | B1 * | 11/2001 | Clarke | E02F 5/32 172/699 |
| 6,321,851 | B1 | 11/2001 | Weiss et al. | |
| 6,578,641 | B2 * | 6/2003 | Bernhardt | A01B 59/068 280/446.1 |
| 6,581,695 | B2 * | 6/2003 | Bernhardt | A01B 59/068 37/234 |
| 6,830,110 | B2 * | 12/2004 | Schlesser | A01B 63/1006 172/8 |
| 7,008,168 | B2 * | 3/2006 | Bernhardt | A01B 63/1006 91/531 |
| 7,073,603 | B2 * | 7/2006 | Nordhoff | A01B 59/068 37/231 |
| 8,347,976 | B2 * | 1/2013 | Bernhardt | A01B 59/062 172/444 |
| 9,795,077 | B2 | 10/2017 | Hahn et al. | |
| 10,080,321 | B2 | 9/2018 | Blackwell et al. | |
| 10,104,824 | B2 | 10/2018 | Blackwell et al. | |
| 10,111,373 | B2 | 10/2018 | Blackwell et al. | |
| 10,130,022 | B2 | 11/2018 | Blackwell et al. | |
| 10,512,209 | B2 | 12/2019 | Hahn et al. | |
| 10,575,453 | B2 | 3/2020 | Blackwell et al. | |
| 10,683,637 | B2 * | 6/2020 | Pitts | E02F 9/0891 |
| 11,477,932 | B2 * | 10/2022 | Selvam | E02F 5/32 |
| 2002/0047248 | A1 * | 4/2002 | Bernhardt | B60D 1/46 280/504 |
| 2002/0125018 | A1 | 9/2002 | Bernhardt et al. | |
| 2003/0217852 | A1 * | 11/2003 | Bernhardt | A01B 59/068 172/200 |
| 2015/0105962 | A1 | 4/2015 | Blackwell | |
| 2015/0105965 | A1 | 4/2015 | Blackwell et al. | |
| 2017/0105330 | A1 | 4/2017 | Mashburn | |
| 2020/0120858 | A1 | 4/2020 | Hahn et al. | |
| 2020/0170169 | A1 | 6/2020 | Blackwell et al. | |

FOREIGN PATENT DOCUMENTS

| | | |
|---|---|---|
| KR | 102001517 B1 | 7/2019 |
| WO | 2017106874 A1 | 6/2017 |

OTHER PUBLICATIONS

European Search Report dated Nov. 21, 2022 for related European Patent Application No. 20855389.1, 8 pages.

Ukrainian Office Action dated Mar. 4, 2024 for related Ukrainian Patent Application No. a202105751, 8 pages.

* cited by examiner

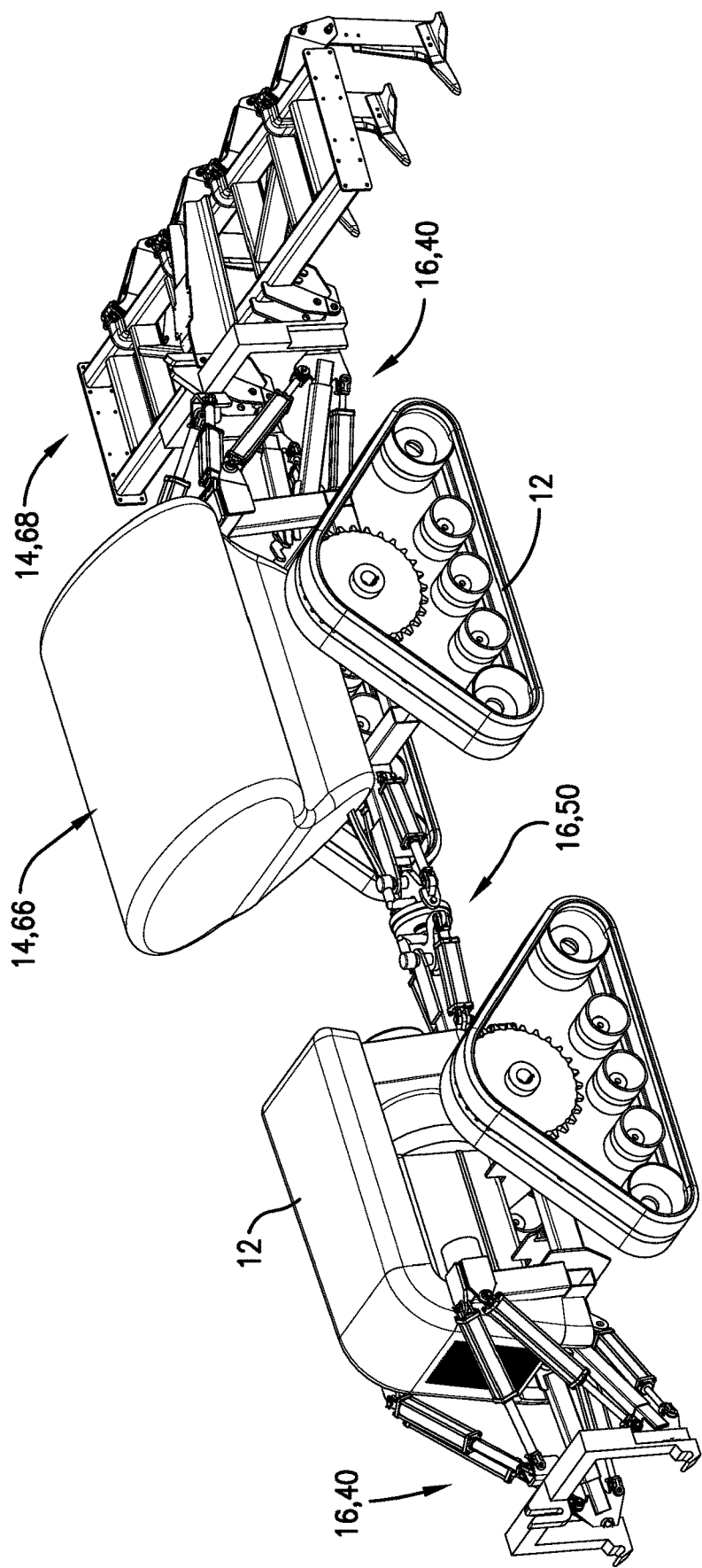

AUTONOMOUS AGRICULTURAL SYSTEM

RELATED APPLICATIONS

The present non-provisional patent application claims priority benefit to prior-filed U.S. Provisional Patent Application Ser. No. 62/961,512, filed on Jan. 15, 2020, and entitled "AUTONOMOUS AGRICULTURAL SYSTEM," and to prior-filed U.S. Provisional Patent Application Ser. No. 63/121,724, filed on Dec. 4, 2020, and entitled "AUTONOMOUS AGRICULTURAL SYSTEM," the entireties of both above-identified provisional patent applications are hereby incorporated by reference into the present non-provisional patent application.

FIELD OF THE INVENTION

Embodiments of the present invention are directed to systems and methods for performing autonomous agricultural operations, such as soil manipulation, seed planting, crop and soil treatment, crop harvesting, and the like.

BACKGROUND OF THE INVENTION

Standard agricultural operations are normally performed by a tractor pulling an agricultural implement through a field. Generally, however, such operations require an operator to be present to control the agricultural operations. Commonly, the operator will be positioned within a cab of the tractor so as to pilot the tractor and operate the components of the implement. It would be beneficial if such agricultural operations could be performed in an automated fashion without the need for an operator, so as to increase the efficiencies of performing agricultural operations.

In addition, it would be beneficial if there existed an automated system with one or more power units that could couple with a variety of different agricultural implements such that various types of agricultural operations could be performed using the automated system. Furthermore, it would be beneficial if the automated system included coupling assemblies for use between the power units and the implements that provide multiple degrees of freedom of positional control of the implements. It would also be beneficial to monitor various aspects of the implements to obtain key parameters of the implements and/or the agricultural operations being performed by the implements. Furthermore, it would be beneficial if the automated system included a coupling assembly used between multiple power units that provide enhanced control, stability, and power distribution between the power units. Furthermore still, it would be beneficial to control, in combination, the coupling assemblies used between adjacent power units and between implements to provide for enhanced control of the power units, of the implements, and overall agricultural operations being performed by the system.

SUMMARY OF THE INVENTION

In one embodiment of the present invention, there is provided an autonomous agricultural system comprising an implement configured to perform an agricultural operation. The system additionally comprises an autonomous power unit for autonomously propelling the implement. The system further comprises a coupling assembly configured to connect the implement to the power unit. The coupling assembly provides at least six degrees of freedom of movement between the implement and the power unit.

An additional embodiment of the present invention includes an autonomous agricultural system comprising an implement configured to perform agricultural operations, and a first autonomous power unit configured to autonomously propel the implement to perform agricultural operations. The first power unit includes a first coupling assembly configured to operably connect the implement to the first power unit. The first power unit further includes a second coupling assembly configured to operably connect the first power unit to a second autonomous power unit.

A further embodiment of the present invention includes an autonomous agricultural system comprising an implement configured to perform agricultural operations, and a first power unit configured to autonomously propel the implement to perform agricultural operations. The first power unit includes at least one coupling assembly and a drive mechanism. The coupling assembly is configured to operably connect the first power unit to the implement or to operably connect the first power unit to a second power unit. The system additionally comprises a control system configured to control the coupling assembly and the drive mechanism. The coupling assembly comprises a plurality of actuators, and the control system includes a plurality of sensors configured to obtain information indicative of positions of the plurality of actuators.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 28 is a perspective view of an autonomous agricultural system according to embodiments of the present invention, with the system including multiple agricultural implements being used for treatment and/or tilling operations and with each agricultural implement being coupled to a power unit.

Figure 1:
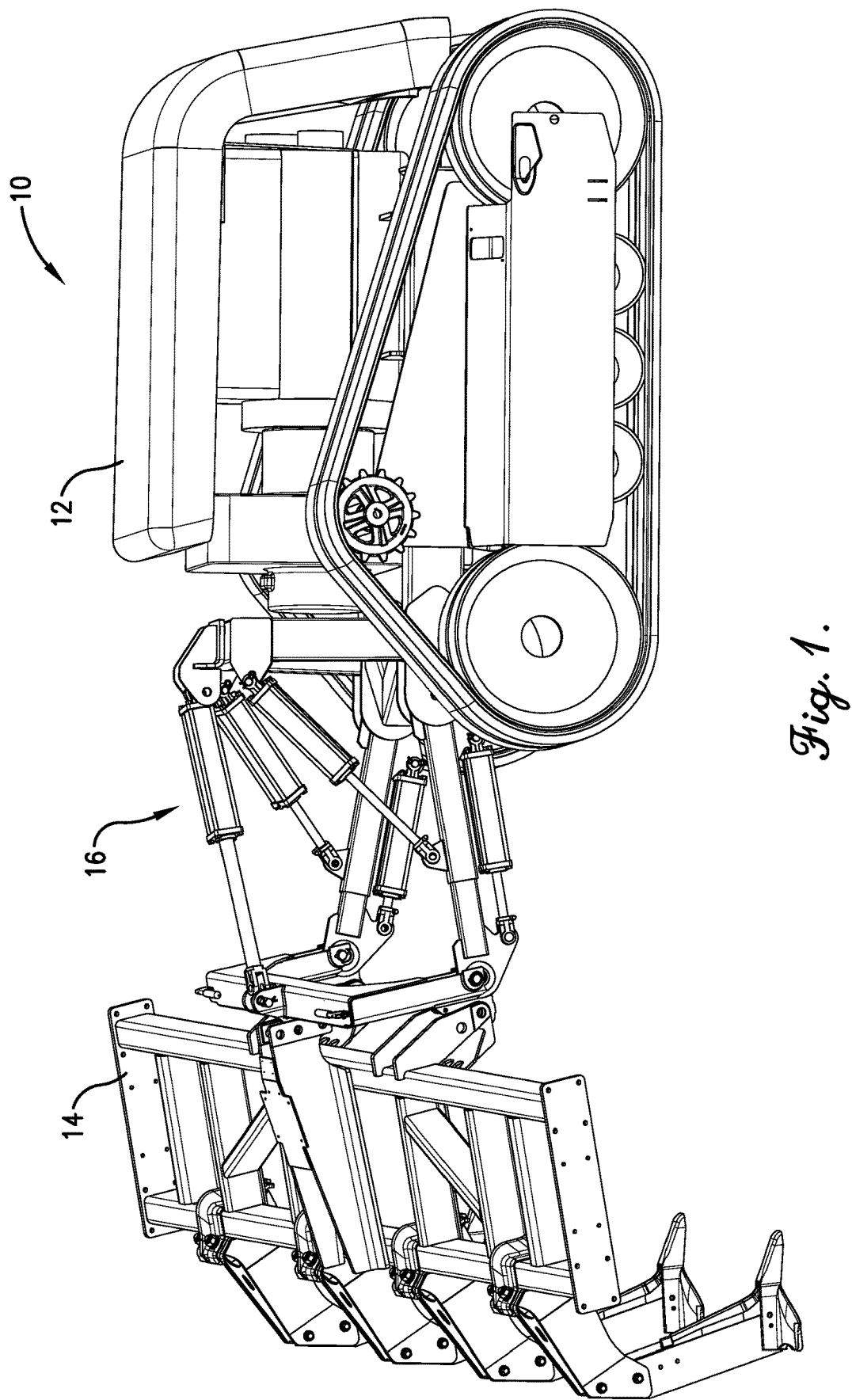
FIG. 1 is a side perspective view of an autonomous agricultural system according to embodiments of the present invention, with the system including an agricultural implement being coupled to a power unit via a coupling assembly.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention are directed to systems and methods for performing autonomous agricultural operations, such as soil manipulation, seed planting, crop and/or soil treatment, crop harvesting, and the like, as will be described in more detail below. Beginning with FIG. 1, embodiments of the present invention may broadly include an autonomous agricultural system 10 comprising at least one power unit 12 configured to propel, transport, and/or provide operating power to at least one implement 14, which may be releasably secured to the power unit 12 via a coupling assembly 16. As such, the power unit 12 is configured to transport the implement 14 across the ground, such that the implement 14 can perform agricultural operations. The implement 14 may, as described in more detail below, comprise various types of tools configured to perform agricultural operations, such as rippers, tillers, coulters, seeders, harvesters, crop sprayers, fertilizer applicators (e.g., a sidedress tool bar), tanks, bins, etc. Beneficially, the power unit 12 may be autonomously operated, such that the agricultural operations may be performed autonomously by the power unit 12 transporting and/or powering the implement 14 without an operator being physically present.

As used herein, directional terms are based on the direction of travel of the system 10. Thus, the terms "front" and "forward" mean a longitudinal direction towards an end of the power unit 12 and/or the implement 14 that faces a direction of travel of the system 10. The terms "back," "rear", or "rearward" mean a longitudinal direction towards an end of the power unit 12 and/or the implement 14 that faces opposite the direction of travel of the system 10. The term "left" or "leftward" means a left lateral direction from a perspective facing the direction of travel, while the term "right" or "rightward" means a right lateral direction from the perspective facing the direction of travel.

Figure 2:
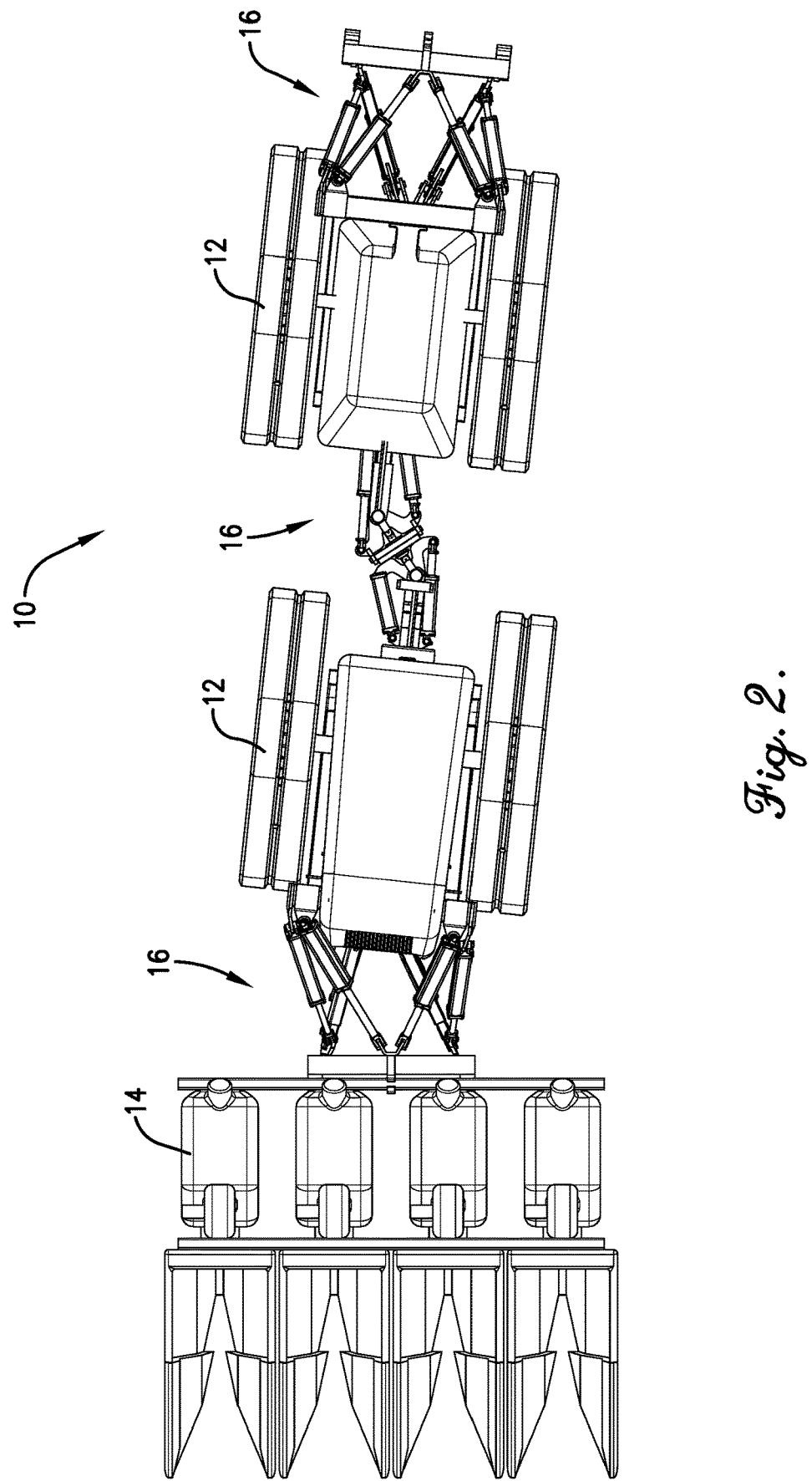
FIG. 2 is a top plan view of an autonomous agricultural system according to additional embodiments of the present invention, with the system including multiple power units connected via a coupling assembly, and with each of the power units including another coupling assembly for supporting an agricultural implement.

In some embodiments, the autonomous agricultural system 10 may comprise a single power unit 12 configured to support and propel a single agricultural implement 14 so as to perform agricultural operations. For example, as illustrated in FIG. 1, the power unit 12 may support a single implement 14 at a rear of the power unit 12 via a coupling assembly 16 extending from the rear of the power unit 12. Alternatively, in some embodiments, the autonomous agricultural system 10 may include a single power unit 12 that supports a single implement 14 at a front or at either lateral side of the power unit 12 via a coupling assembly 16 extending from the front or sides of the power unit 12. In further embodiments, the autonomous agricultural system 10 may include a single power unit 12 that supports multiple implements 14 (e.g., at both a front and rear end of the power unit 12), each via a coupling assembly 16 extending from the power unit 12. In still further embodiments, the autonomous agricultural system 10 may comprise multiple power units 12 interconnected via a coupling assembly 16. For instance, as shown in FIG. 2, a first power unit 12 (e.g., a front power unit 12) may be operably connected to a second power unit (e.g., a rear power unit 12) via a coupling assembly 16 extending from a rear of the first power unit 12 to a front of the second power unit 12. Each of the first and second power units 12 may support separate implements 14 via individual coupling assemblies 16. For example, one implement 14 may extending from the front of the first power unit 12 (supported by a coupling assembly 16), while a second implement 14 (not shown in FIG. 2) may extend from the rear of the second power unit 12 (supported by a coupling assembly 16), with each implement 14 being used to perform agricultural operations. The coupling assemblies 16 used to connect power units 12 and implements 14 and/or power units 12 to each other will be described in more detail below. Regardless of whether separate, individual power units 12 and/or multiple, physically-interconnected power units 12 are used, the autonomous agricultural system 10 may be configured to operate a plurality of such power units 12 in an automated, coordinated manner to perform agricultural operations.

Figure 3:
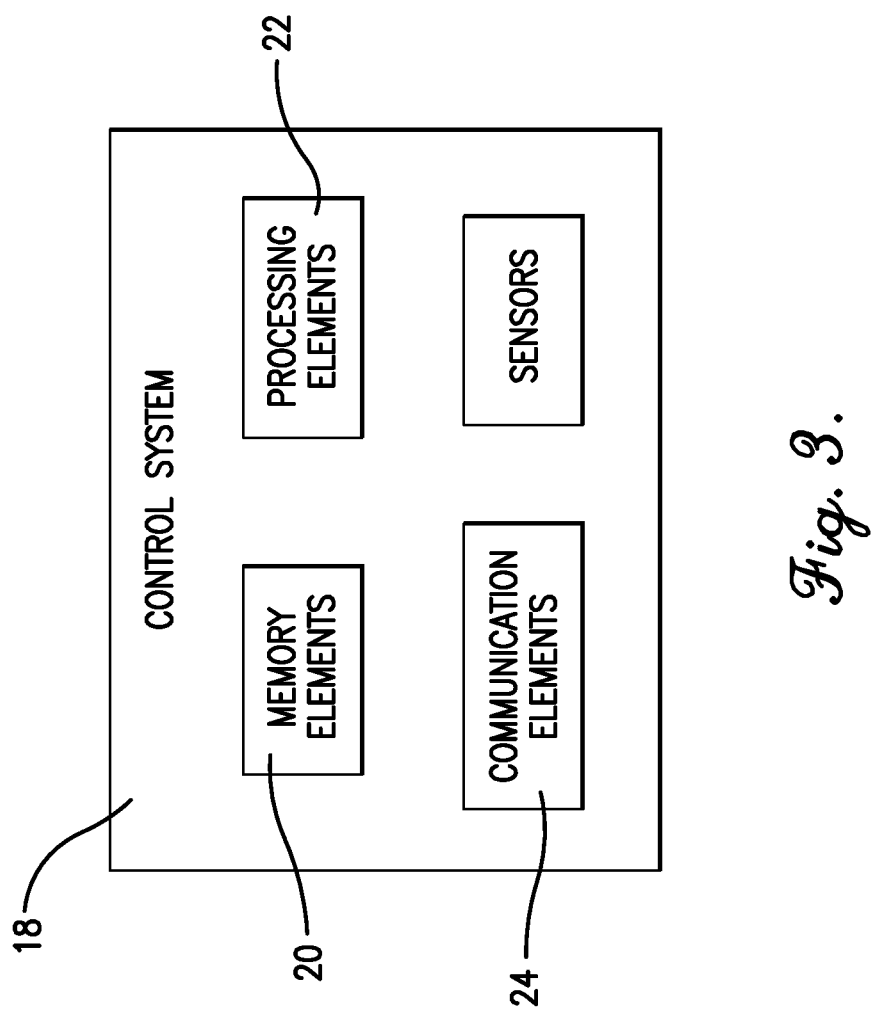
FIG. 3 is a schematic illustration of a control system for an autonomous agricultural system according to embodiments of the present invention.

In more detail, to facilitate such coordination, the autonomous agricultural system 10 may include a control system 18, as illustrated schematically in FIG. 3, that receives inputs/data from various sensors (which may form part of the control system 18) and that controls operation of the one or more power units 12, one or more associated implements 14, and/or one or more coupling assemblies 16 based on such inputs/data. The control system 18 may be incorporated with one of the power units 12. Alternatively, the control system 18 may be distributed among multiple power units 12. In further alternatives, the control system 18 may be incorporated within one or more of the implements 14 and/or coupling assemblies 16. In still further alternatives, the control system 18 may be remote, such as separated from the power units 12, implements 14, and/or coupling assemblies 16. Regardless, such sensors may include location-determining elements (e.g., global positioning sensors/receivers ("GPS"), global navigation signal system ("GNSS"), real time kinematics (RTK), over-the-air, broadband, wide area network ("WAN"), local area network ("LAN"), etc.), vision-based sensors (e.g., video cameras, infrared (IR) cameras, LIDAR, RADAR, etc.), position sensors, temperature sensors, moisture sensors, pressure sensors, and the like. Such sensors may be positioned on the power units 12, the implements 14, and/or on the coupling assemblies 16, as will be described in more detail below.

To facilitate communication with the sensors, the control system 18 may communicate with the sensors internally (e.g., the control system 18 can communicate with sensors located in, on, or adjacent to the power units 12, the implements 14, and/or the coupling assemblies 16) and/or externally (e.g., the control system 18 can communicate with sensors located external to the power units 12, the implements 14, and/or the coupling assemblies 16). As such, the sensors and the control system 18 will generally include communications components/elements necessary for wired or wireless communication (e.g., radiofrequency transceivers, such as cellular, Wi-Fi, Bluetooth, or the like). The control system 18 may communicate over networks, such as over-the-air networks, broadband, WAN, LAN, etc. Based on the inputs/data from the various sensors, the control system 18 may control operation of the power units 12, the implements 14, and/or the coupling assemblies 16, as will be discussed in more detail below. The control system 18 may use the communication elements to communicate with components of the power units 12, the implements 14, and/or the coupling assemblies 16 to facilitate such control.

As illustrated by FIG. 3, the control system 18 may include one or more memory elements 20, such as non-transitory computer readable media and/or firmware, with a computer program stored thereon. The control system 18 may also include one or more processing elements 22, such as processors, CPUs, FPGAs, etc., which are configured to execute the computer program to perform various functions and features of the autonomous agricultural system 10 described herein. Thus, it should be understood that certain of the autonomous agricultural system's 10 functions and features discussed above and below are performed by execution of the computer program (stored on the memory elements) by the processing elements. For example, the control system 18 may be configured to (by the processing elements 22 executing the computer program stored on the memory elements 20) (i) obtain information/data from various sensors associated with the autonomous agricultural system 10 (e.g., location-determining elements in the form of a GPS receivers, positions sensors associated with the coupling assemblies 18, etc.), and (ii) control the position, motion, and various operations of the power units 12, the implements 14, and/or the coupling assemblies 16 based on such sensor information/data. As was described above, the control system 18 may also include one or more communication elements 24 to facilitate communication with the various sensors, as well as with the power units 12, the implements 14, and/or the coupling assemblies 16.

As was noted above, the autonomous agricultural system 10 may include a plurality of power units 12, each perhaps being paired with at least one separate implement 14. In certain of such embodiments, each power unit 12 may be independently controlled, e.g., autonomously and/or remotely. For example, each of the power units 12 may be controlled autonomously via one or more control systems 18 that individually operate the power units 12 and/or the implements 14 based on data obtained from various sensors. Alternatively, the power units 12 may be remotely controlled (e.g., remotely steerable) by a remote operator. In additional embodiments, the power units 12 may work together (e.g., as a swarm) to perform agricultural operations. In such embodiments, the multiple power units 12 and paired implements 14 may communicate (e.g., wirelessly) with each other to aid in autonomous guidance and to maximize operational efficiencies. For example, each mobile power unit 12 may be configured to communicate with the other power units 12 to create one or more feedback loops to improve guidance, improve stability, maximize/optimize traction, and/or maximize/optimize floatation of the power units 12 and/or their associated implements 14. In some embodiments, the control system 18 will incorporate machine learning techniques (e.g., using the data obtained from the plurality of power units 12 and/or implements) to continually improve performance of the system 10.

Figure 4:
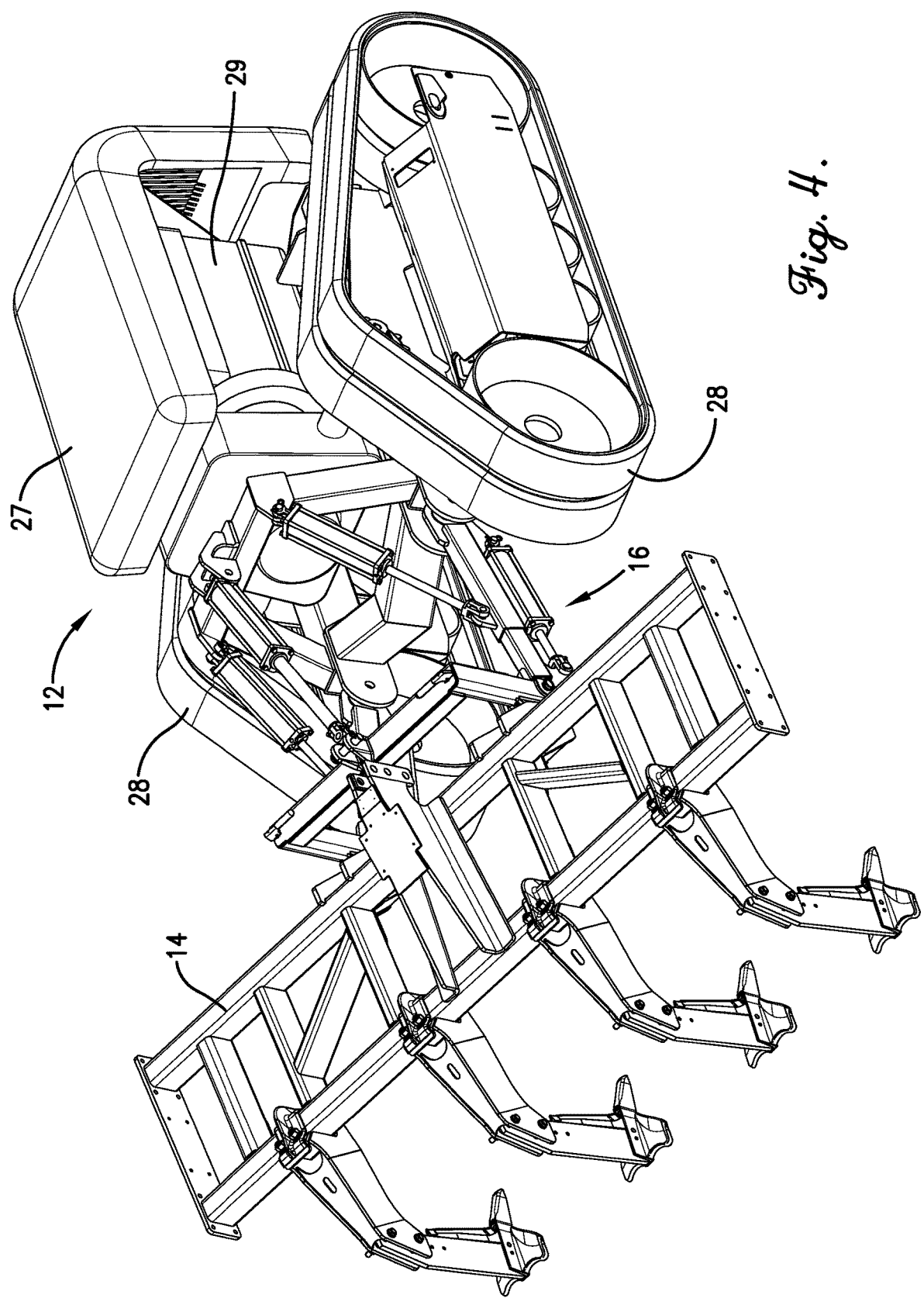
FIG. 4 is a rear perspective view of the autonomous agricultural system from FIG. 1.
Figure 5:
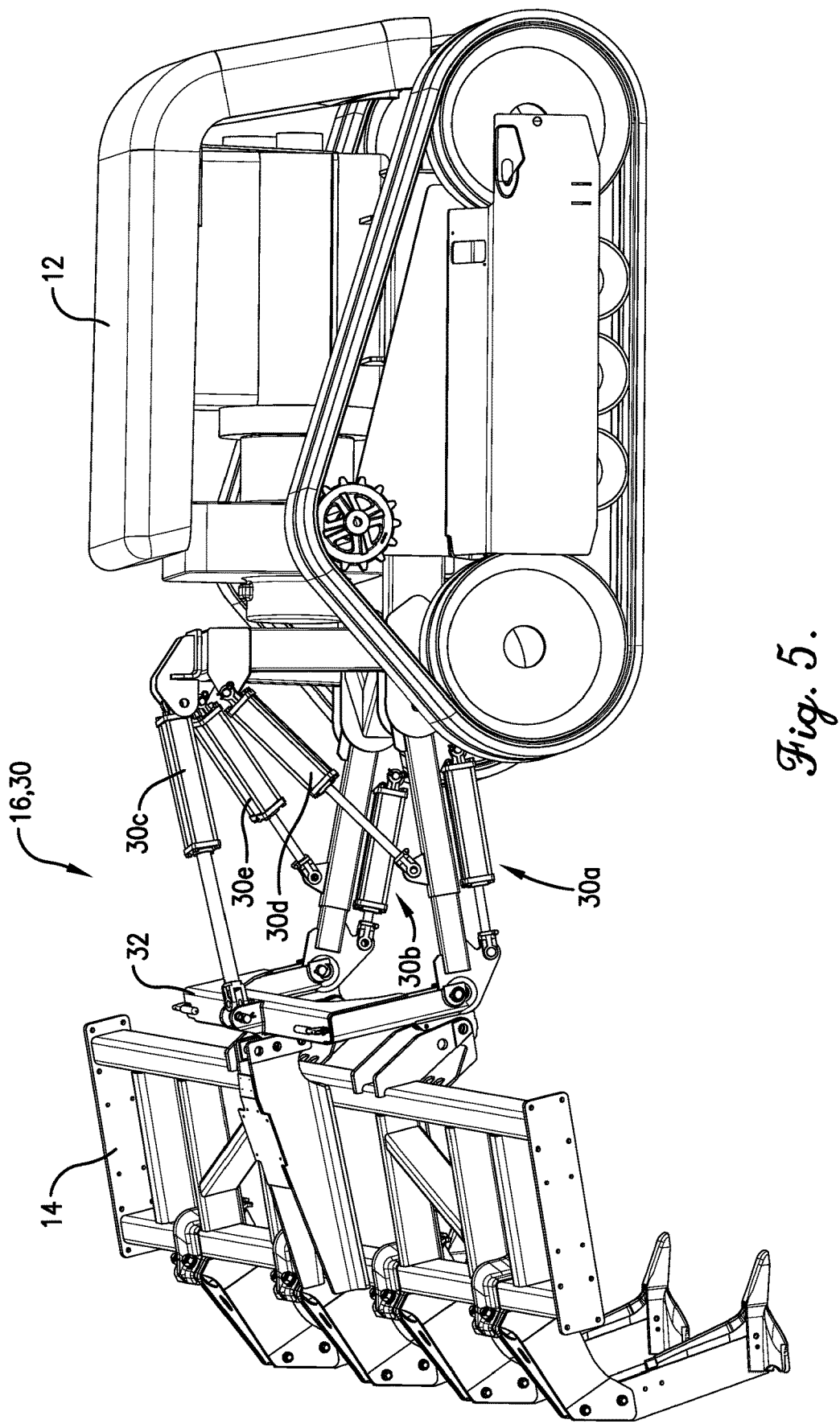
FIG. 5 is another side perspective view of the autonomous agricultural system from FIGS. 1 and 4.
Figure 6:
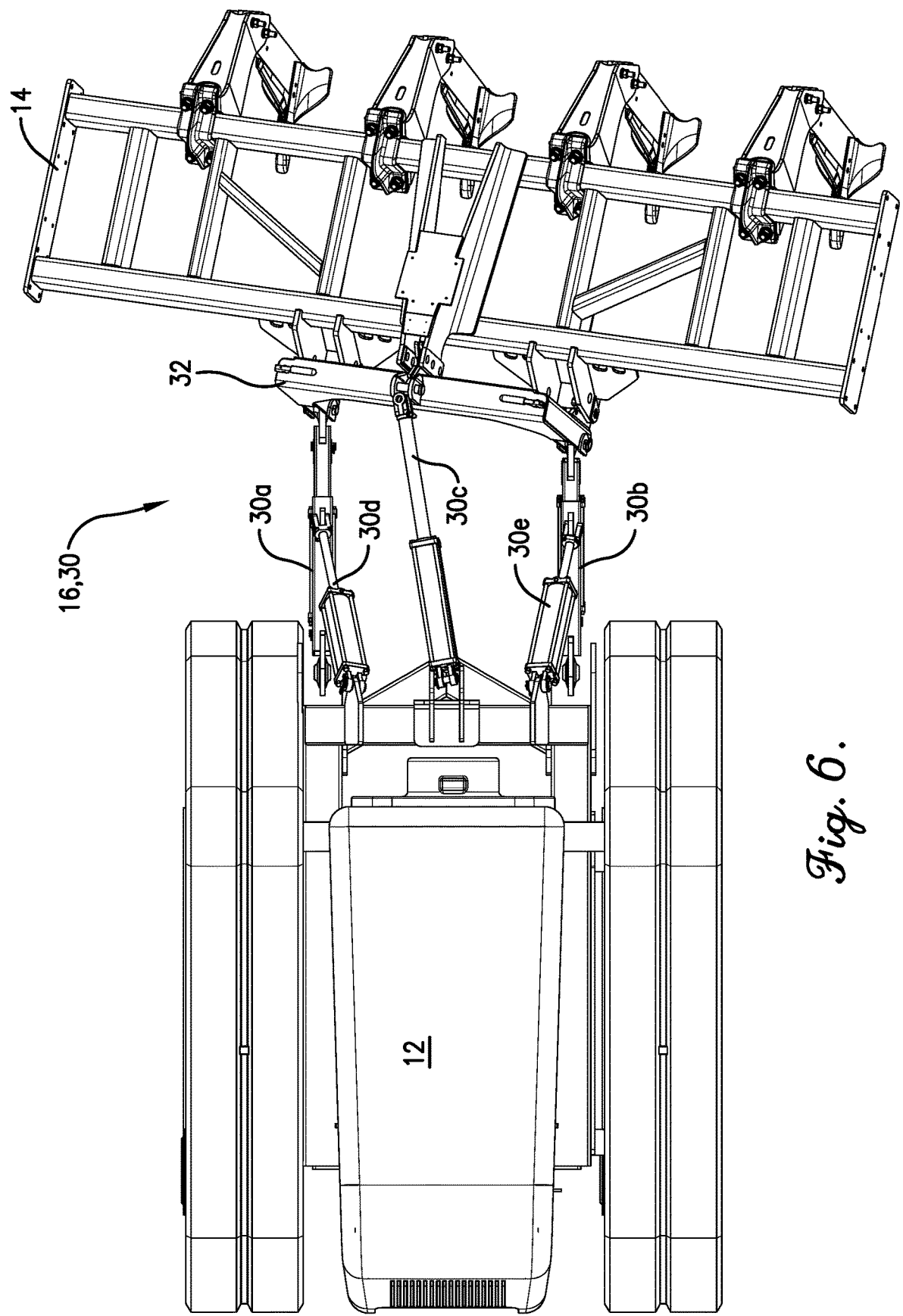
FIG. 6 is a top plan view of the autonomous agricultural system from FIGS. 1, 4, and 5.
Figure 7:
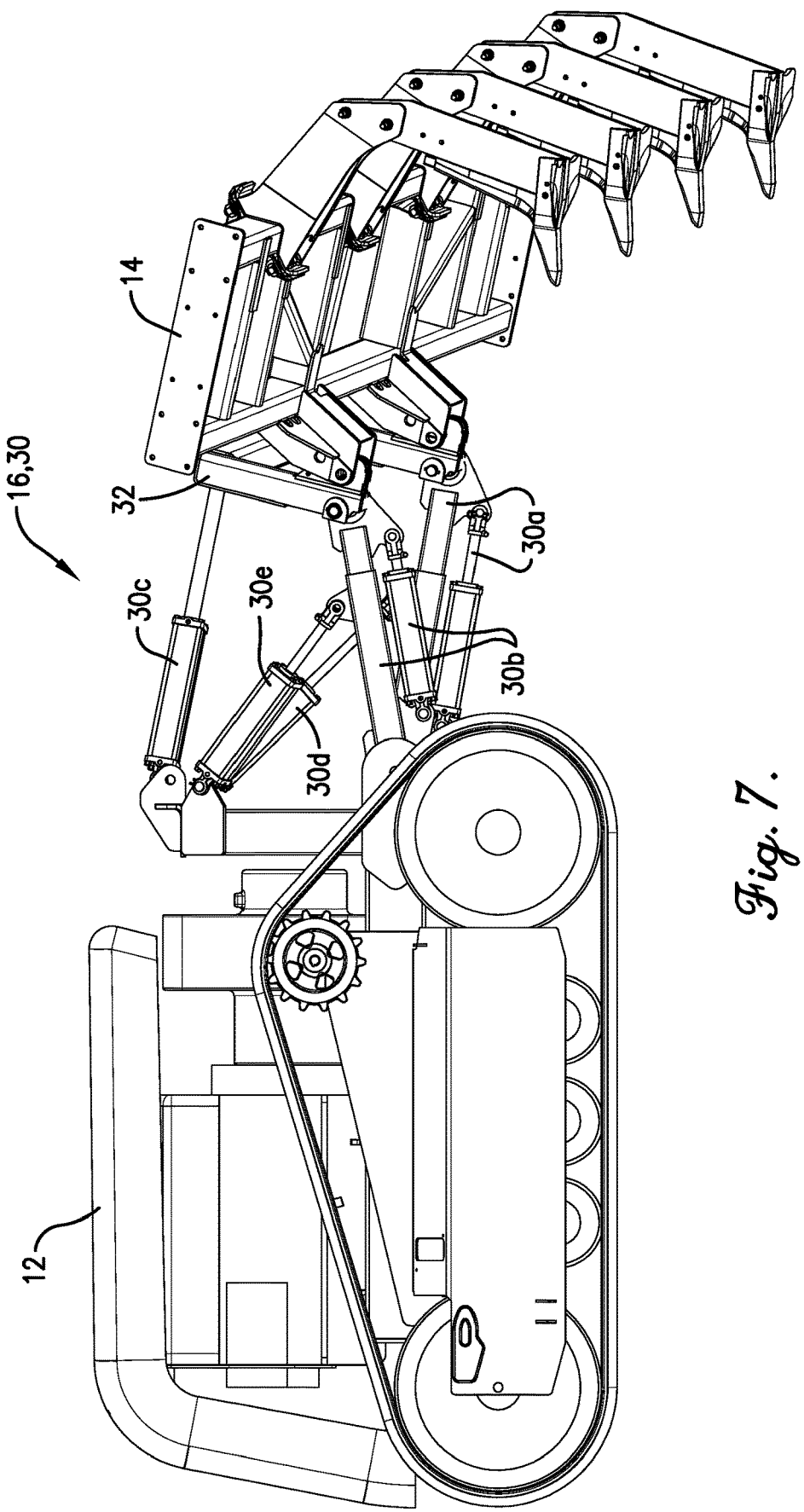
FIG. 7 is another side perspective view of the autonomous agricultural system from FIGS. 1 and 4-6.
Figure 8:
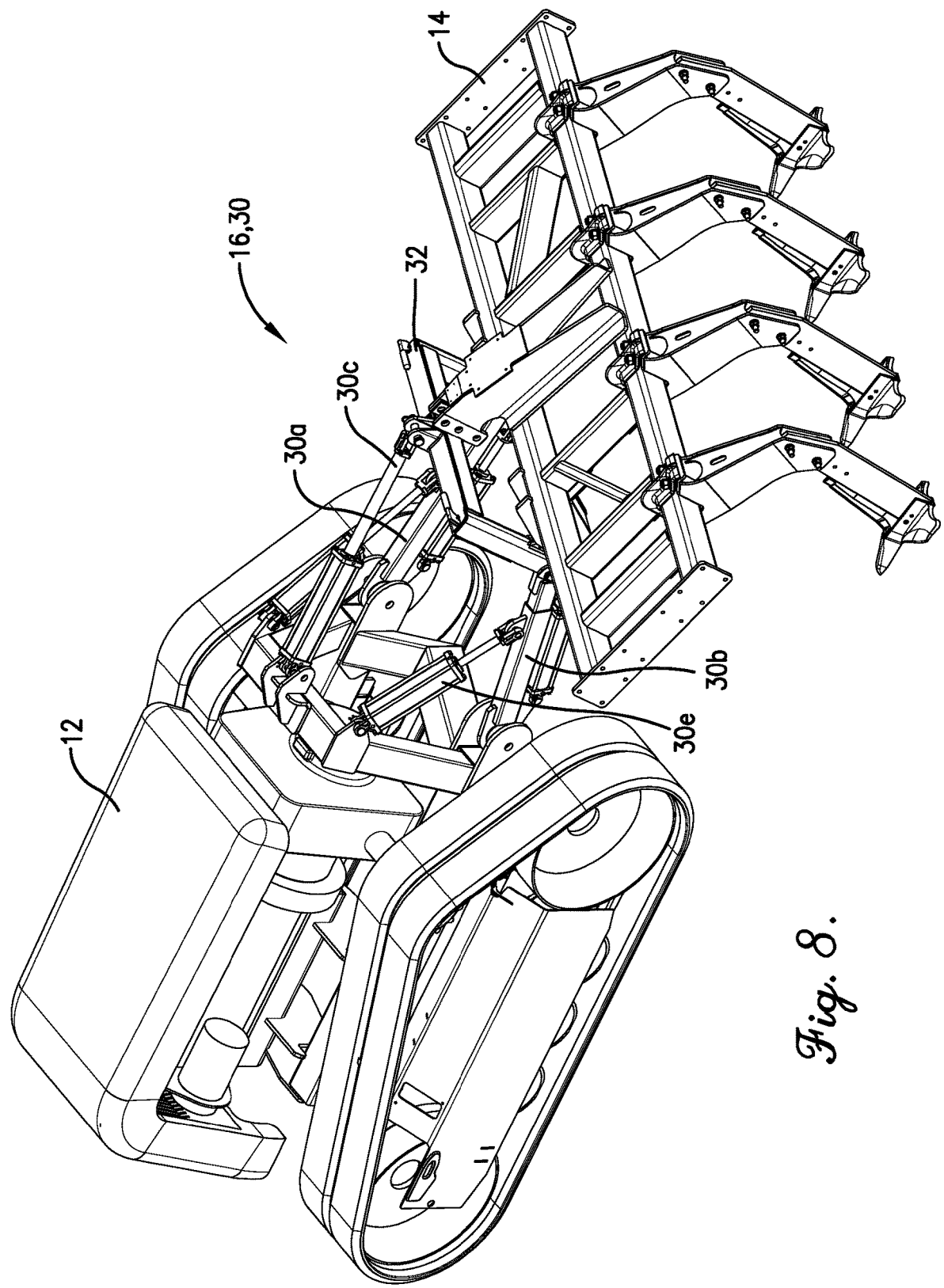
FIG. 8 is another rear perspective view of the autonomous agricultural system from FIGS. 1 and 4-7.
Figure 9:
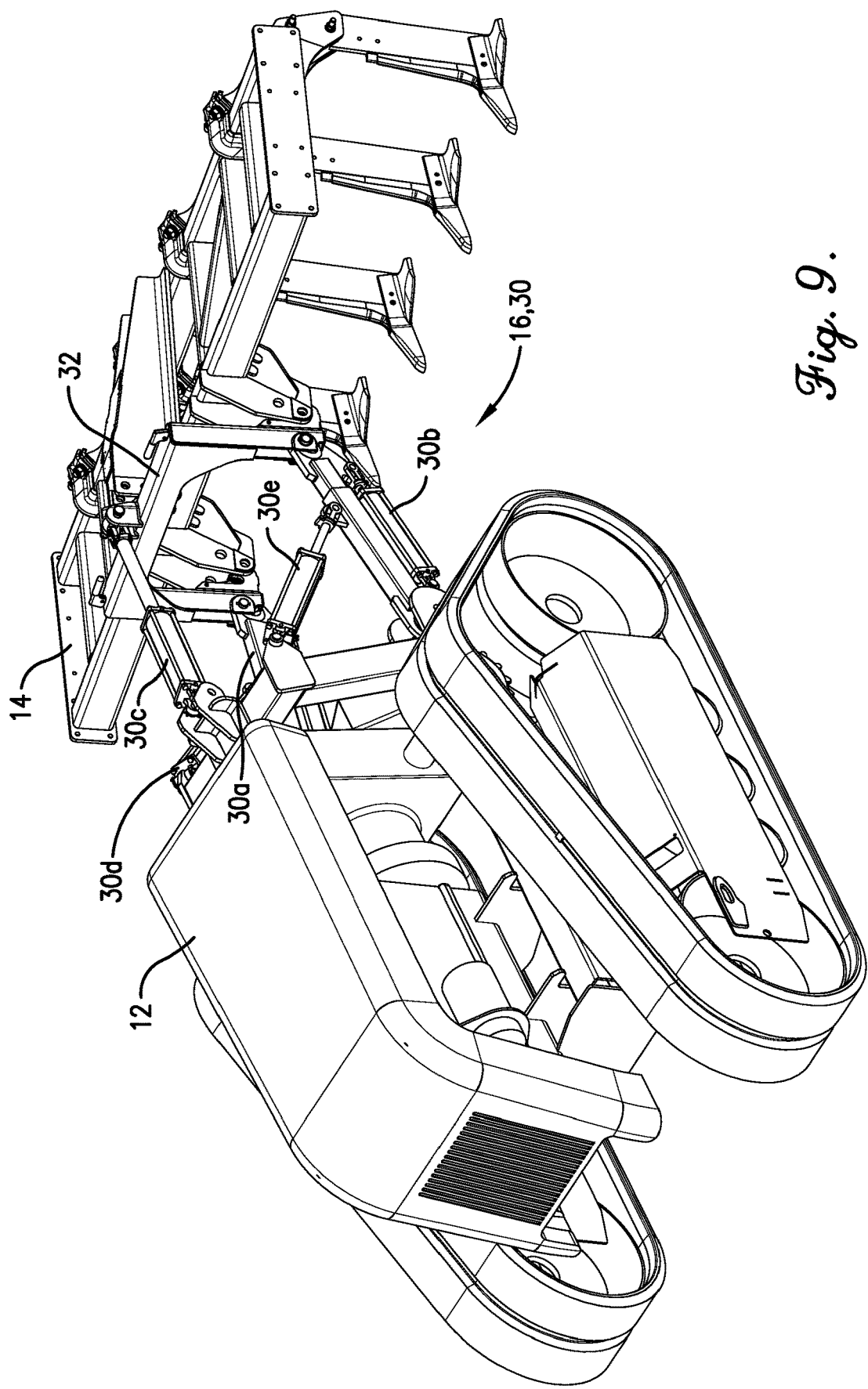
FIG. 9 is a front perspective view of the autonomous agricultural system from FIGS. 1 and 4-8.

Turing to the power unit 12 in more detail, the power unit 12 may comprise a body 27, a drive mechanism 28, and a power supply, as illustrated in FIG. 4. The drive mechanism 28 may support the body 27 on the ground and may comprise one or more wheels or tracks, which are used to propel and maneuver the power unit 12. The drive mechanism 28 may be configured to provide tractive power to the power unit 12 such that the power unit 12 can maneuver in generally any direction (e.g., forward, rearward, rightward, leftward, and oblique directions). The drive mechanism 28 may be powered by a power supply 29, which may comprise one or more electrical storage components (e.g., batteries), combustion engines (to generate rotary power), electrical generators (to generate electrical power), hydraulic pumps (to generate hydraulic power), fuel tanks/pumps (to store and provide fuel), or the like. The drive mechanism 28 may include various types of motors (e.g., electric or hydraulic motors powered by the power supply 29) to provide tractive power to the wheels/tracks of the drive mechanism 28. The power supply 29 of the power unit 12 may also provide power to the implement 14 to which the power unit 12 is operably connected. In some embodiments that include multiple interconnected power units 12, one of the power units 12 may provide power to the other power units 12 and/or to the implements 14 associated with such other power units 12, with such power being transferred via the associated coupling assemblies 16 and/or other power transfer elements (e.g., cables, conduits, power-take off drives, etc.).

As was noted above, and as will be discussed in more detail below, the implement 14 may comprise various types of implements configured to perform agricultural operations. For instance, the implement 14 may comprise a tiller, ripper, scraper, scarifier, or the like, configured to modify the ground soil. As such, the implement 14 may include tillage discs, furrow opening discs, packer wheels, harrows, finishing reels, fixed blades, etc. In some embodiments, the implements 14 may comprise an agricultural implement configured to insert or apply material (e.g., seed or treatment, such as fertilizer, growth regulator, biological organism, herbicide, and/or pesticide/insecticide) into or onto the ground. As such, the implement 14 may comprise seeders with multiple row units (e.g., with opening discus and seed applicators), granule applicators, sprayers, etc. In still further alternatives, the implements 14 may comprise an agricultural implement configured to harvest crop from the ground, such as harvesters. Regardless, in some embodiments, the implements 14 may include tractive components (e.g., wheels, the tillage discs, furrow opening discs, packer wheels, harrows, finishing reels, etc.) that may partially support the implement 14 and that may aid in propelling or providing tractive effort to various components of the autonomous agricultural system 10 (e.g., to the implements 14 and/or to the power units 12) and/or to provide operating power to other components of the system 10.

Each coupling assembly 16 may be configured to operably and releasably connect a power unit 12 to an implement 14, and/or to operably and releasably connect a power unit 12 to another power unit 12. The connection assemblies 16 may comprise various types of mechanisms, some of which are discussed in more detail below, configured to permit a power unit 12 to support, propel, and/or provide power to an implement 14 and/or other power units 12. For example, the power unit 12 may be configured to pull or push the implement 14, via a connection assembly 16. In certain embodiments, the connection assembly 16 may also be configured to transfer power from the power unit 12 to the implement 14 (e.g., from the power supply 29). For instance, the power supply 29 may provide rotary power, electrical power, hydraulic power, and/or fuel to the implement 14. In some embodiments, the coupling assembly 16 may be part of the power unit 12. Alternatively, the coupling assembly 16 may be part of the implement 14. In further alternatives, a portion of the coupling assembly 16 may form part of the power unit 12 while another portion of the coupling assembly 16 may form part of the implement 14. In even further alternatives, the coupling assembly 16 may be a mechanism that is independent of either of the power unit 12 and the implement 14.

In certain embodiments, as illustrated in FIGS. 5-9, the coupling assembly 16 may comprise a five-actuator coupler 30 including five actuators for adjusting the position and/or orientation of the implement 14 being supported and/or propelled by the power unit 12. The five-actuator coupler 30 may comprise a right lower link 30a (comprised of a telescopic link element and an associated actuator), a left lower link 30b (comprised of a telescopic link element and an associated actuator), an upper link 30c (e.g., comprising an actuator), a right vertical lift actuator 30d, and a left vertical actuator 30e. In such embodiments, the actuators may comprise components that extend and retract (e.g., telescopically), such as hydraulic cylinders. However, alternative actuator configurations may be used, such as pneumatic cylinders, electric actuators (e.g., electric motors, linear actuators, rotating actuators, or the like), etc. In some embodiments, the five-actuator coupler 30 may include or otherwise be associated with a coupling element 32, such as three-point hitch coupling element, which is connected on one side to one or more of the actuators and/or links of the five-actuator coupler 30 and on the other side to the implement 14 (e.g., to releasably secure the implement 14 to the coupling assembly 16 and/or power unit 12).

The five-actuator coupler 30 may be used to releasably connect a power unit 12 to various types of implements 14. Because the five-actuator coupler 30 may include or otherwise be associated with the coupling element 32 in the form a three-point hitch, the five-actuator coupler 30 may be in the general form of a three-point "quick-hitch" configured for attachment to implements 14 that releasably accept three-point hitch connections. Alternatively, or in addition, the five-actuator coupler 30 may include a coupling element 32 in the form of a standard drawbar configured for attachment to implements 14 that accept standard drawbar connections.

The right lower link 30a may extend from the power unit 12 to a right lower hitch point of the coupling element 32. Specifically, each of the telescopic link element and an associated actuator of the right lower link 30a may extend from the power unit 12 to a right lower hitch point of the coupling element 32. In certain embodiments, the right lower hitch point of the coupling element 32 may be associated with a right lower hitch mount that extends from the coupling element 32 for connection with both the telescopic link element and an associated actuator of the right lower link 30a. The telescopic link element of the right lower link 30a may include a base element and an extension element that extends and retracts within the base element. The base element may be connected to the power unit 12, while the extension element may be connected with the coupling element 32. The right vertical lift actuator 30d may likewise extend from the power unit 12 to a connection point on the right lower link 30a (or to the right lower hitch mount in certain embodiments). In some embodiments, the right vertical lift actuator 30d will connect with the base element of the right lower link 30a, so as to permit the right lower link 30a to telescopically actuate.

In some embodiments, the right lower link 30a may be configured to extend and retract (e.g., telescopically) so as to cause the right lower hitch point of the coupling element 32, as well as the right side of the implement 14, to selectively extend away or draw closer to the power unit 12. In some embodiments, the extension/retraction of the right lower link 30a will be controlled by actuation of the associated actuator (e.g., the hydraulic cylinder of the right lower link 30a). Specifically, the actuator may extend and retract so as to force the right lower link 30a and/or the right hitch mount rearward and forward, respectively. As such, the coupling element 32, as well as the implement 14, may be turned left/right. Stated differently, the coupling element 32, as well as the implement 14, may be rotated about a generally vertical yaw axis. Finally, the right vertical lift actuator 30d may extend and retract so as to selectively raise and lower the right lower link 30a, and to also raise and lower the right lower hitch point of the coupling element 32 and the right side of the implement 14. Due to such raising and/or lowering, the coupling element 32, as well as the implement 14, may be rotated about a horizontal roll axis that extends generally longitudinally (i.e., aligned with the direction of travel of the power unit 12). It should be understood that each of the above described connections between the five-actuator coupler 30 and the unit 12 and/or the coupling element 32 may comprise pivot connections. In addition, each of the above-described actuators may be powered hydraulically, electrically, pneumatically, etc.

Similarly, the left lower link 30b may extend from the power unit 12 to a left lower hitch point of the coupling element 32. Specifically, each of telescopic link element and an associated actuator of the left lower link 30b may extend from the power unit 12 to the left lower hitch point of the coupling element 32. In certain embodiments, the left lower hitch point of the coupling element 32 may be associated with a left lower hitch mount (similar to the right lower hitch mount discussed above) that extends from the left lower hitch point for connection with both the telescopic link element and the actuator of the left lower link 30b. The telescopic link element of the left lower link 30b may include a base element and an extension element that extends and retracts within the base element. The base element may be connected to the power unit 12, while the extension element may be connected with the coupling element 32. The left vertical lift actuator 30e may likewise extend from the power unit 12 to a connection point on the left lower link 30b (or to the left lower hitch mount in certain embodiments). In some embodiments, the left vertical lift actuator 30e will connect with the base element of the left lower link 30b, so as to permit the left lower link 30b to telescopically actuate.

In certain embodiments, the left lower link 30b may be configured to extend and retract (e.g., telescopically) so as to cause the left lower hitch point of the coupling element 32, as well as the left side of the implement 14, to selectively extend away or draw closer to the power unit 12. In some embodiments, the extension/retraction of the left lower link 30b will be controlled by actuation of the associated actuator (e.g., the hydraulic cylinder of the left lower link 30b). Specifically, the actuator may extend and retract so as to force the left lower link 30b and/or the left hitch mount rearward and forward, respectively. As such, the coupling element 32, as well as the implement 14, may be turned left/right. Stated differently, the coupling element 32, as well as the implement 14, may be rotated about the generally vertical yaw axis. Finally, the left vertical lift actuator 30e may extend and retract so as to selectively raise/lower the left lower link 30b, and thus the raise/lower the left lower hitch point of the coupling element 32 and the left side of the implement 14. Due to such raising and/or lowering, the coupling element 32, as well as the implement 14, may be rotated about a horizontal roll axis that extends generally longitudinally (i.e., aligned with the direction of travel of the power unit 12). It should be understood that each of the above described connections between the five-actuator coupler 30 and the unit 12 and/or the coupling element 32 may comprise pivot connections. In addition, each of the actuators may be powered hydraulically, electrically, pneumatically, etc.

Finally, the upper link 30c may extend from the power unit 12 to a central, upper hitch point of the coupling element 32. The upper hitch point may be defined by an upper hitch mount associated with the coupling element 32. The upper link 30c may extend and retract so as to cause the coupling element 32 and the implement 14 to tilt about a tilt axis that is generally aligned with a lateral direction (i.e., orthogonal to the travel direction of the power unit 12 and implement 14). It should be understood that the connection of the upper link 30c between the power unit 12 and the coupling element 32 may comprise pivot connections. In addition, the upper link 30c may be powered hydraulically, electrically, pneumatically, etc.

The above-described embodiments of the coupling assembly 16 in the form of a five-actuator coupler 30 provide various benefits. For example, because the five-actuator coupler 30 may include (or otherwise be associated with) a coupling element 32 in the form of a traditional three point "quick hitch," the five-actuator coupler 30 allows compatibility between new power units 12 and traditional or existing implements 14. As such, the mounted implement 14 can behave as if the implement 14 was connected to a traditional tractor via three-point hitch. Adding a drawbar link to the coupling assembly 16 allows for functionality of a traditional tractor drawbar. As such, in some embodiments, the five-actuator coupler 30 can be configured to act as a simple drawbar towing an implement 14 behind it. The implement 14 can, thus, behave as if the implement 14 is being towed by a traditional tractor via towbar.

Returning to the three-point hitch configuration of the coupling element 32, the right and left lower links 30a, 30b are configured to extend and retract independently, as well as to raise and lower independently (via the right and left vertical lift actuators 30d, 30e). The upper link 30c is also configured to extend and retract independently. Thus, the coupling assembly 16 in the form of the five-actuator coupler 30 can be configured to act as a traditional three-point hitch that supports the mounted implement 14. Furthermore, the five-actuator coupler 30 can be configured to raises and lower the implement 14 and to provide multiple degrees of freedom, via the links and actuators of the five-actuator coupler 30, between the implement 14 and the power unit 12.

For example, the left and right lower links 30a, 30b can extend and retract to selectively (i) push the entire implement 14 rearward, away from the power unit 12, (ii) draw the entire implement 14 forward, toward the power unit 12, or (iii) draw one side of the implement 14 closer to the power unit 12 than the other side of the implement 14, so as to position the implement 14 (rotated about a vertical yaw axis) in an angled orientation with respect to a lateral direction (i.e., with the lateral direction being orthogonal to the direction of travel of the power unit 12 and implement 14). Similarly, the right and left vertical lift actuators 30d, 30e can selectively (i) raise the entire implement 14 upward, away from the ground, (ii) lower the entire implement 14 downward, towards the ground, or (iii) raise/lower one side of the implement 14 away from/toward (or into engagement with) the ground to a greater extent than the other side of the implement 14 (e.g., such that the implement 14 can be rotated about a longitudinal roll axis). In addition, actuation of the upper link 30c allows the implement 14 to be tilted about a lateral tilt axis.

Finally, the left and right lower links 30a, 30b are configured to rotate the implement 14 in coordination with the upper link 30c about a longitudinal roll axis that is generally aligned with a direction of travel of the power unit 12 and/or implement 14. In more detail, when only one lower link 30a, 30b extends or retracts and the other lower 30a, 30b remains stationary, the implement 14 will tilt (forward/rearward) and also rotate in a slight turn. If both lower links 30a, 30b move the same direction and the upper link 30c is stationary the implement 14 will tilt forward or backward. If one lower link 30a, 30b extends and the other lower link 30a, 30b retracts while the upper link 30c is stationary, the implement 14 will rotate in a turn left or right. By controlling all three links 30a, 30b, 30c together, the five-actuator coupler 30 can orient the implement 14 generally to any required position behind the power unit 14. For example, the five-actuator coupler 30 may be configured to shift the implement 14 via vertical translation, lateral translation, longitudinal translation, rotation about a vertical yaw axis, rotation about a longitudinal roll axis, and rotation about a lateral tilt axis. In some embodiments, to increase stability, the coupling assembly 16 may include "sway blocks" associated with the lower links 30a, 30b to act as travel limits to keep the implement 14 centered on the power unit 12. As such, the coupling assembly 16 permits the power unit 12 to keep the implement 14 appropriately in contact with the soil by responding to various condition changes (e.g., terrain variations).

Figure 10:
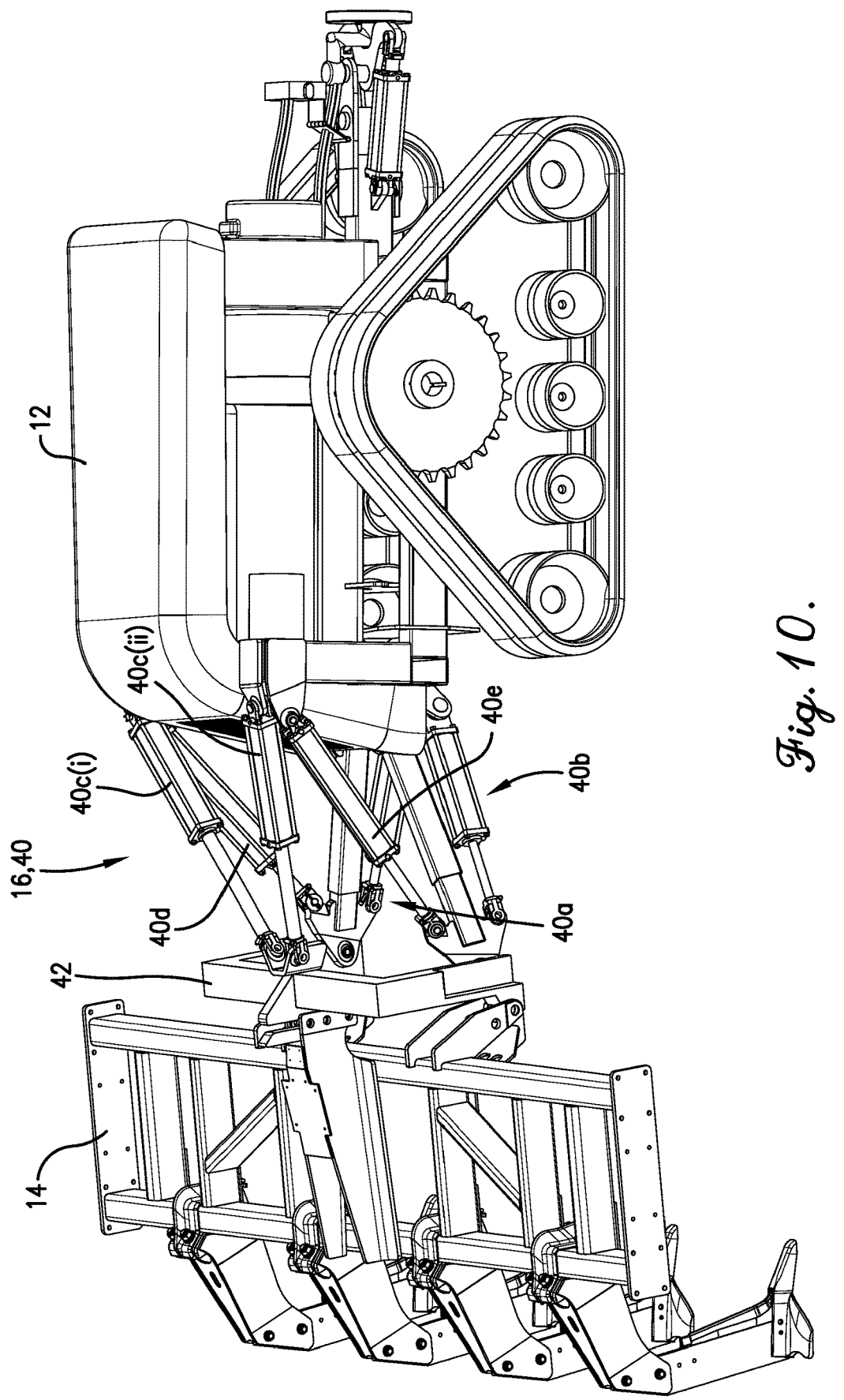
FIG. 10 is a side perspective view of an autonomous agricultural system according to further embodiments of the present invention, with the system including an agricultural implement being coupled to a power unit via an additional embodiment of a coupling assembly.
Figure 11:
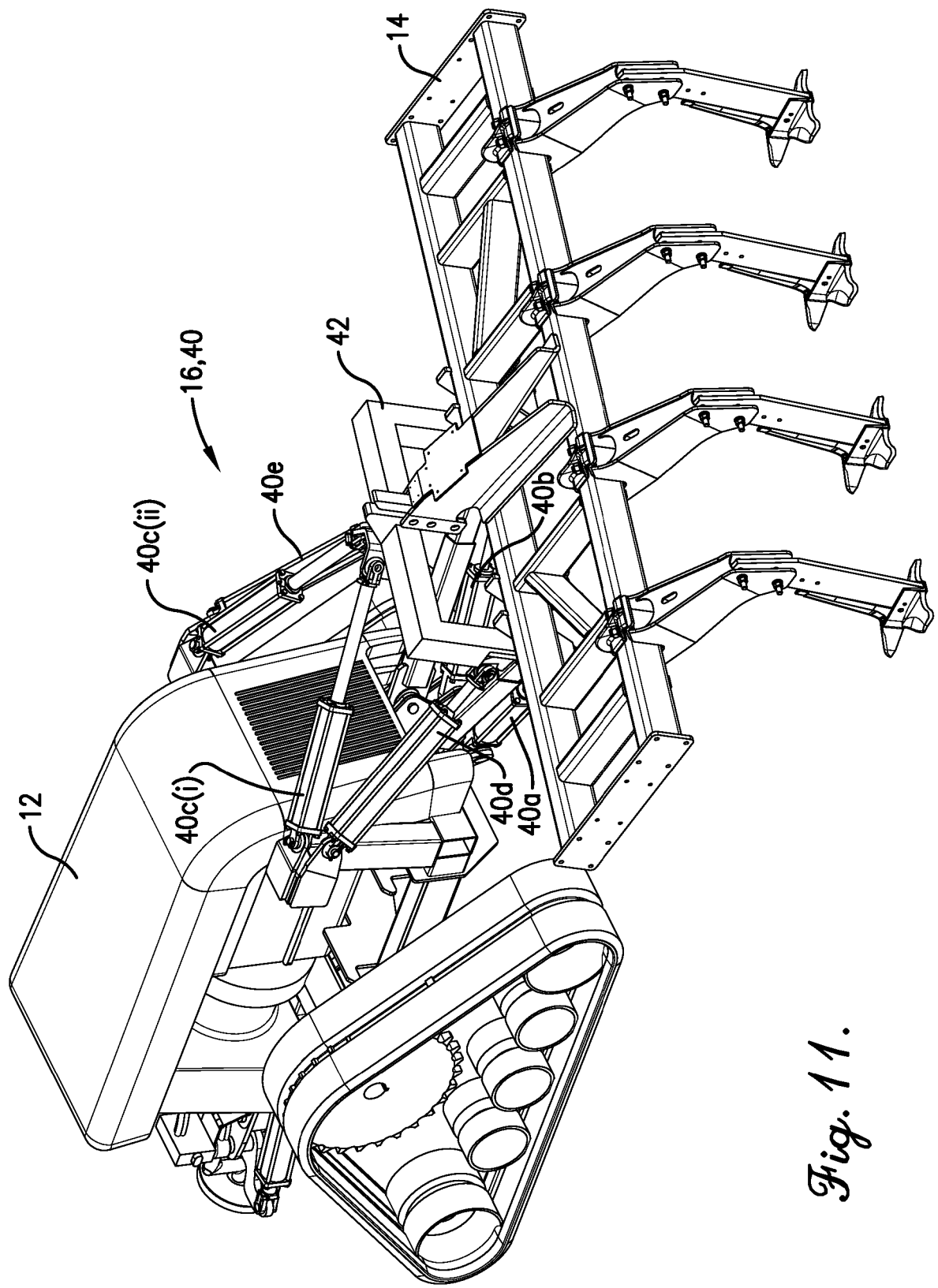
FIG. 11 is a front perspective view of the autonomous agricultural system from FIG. 10.
Figure 12:
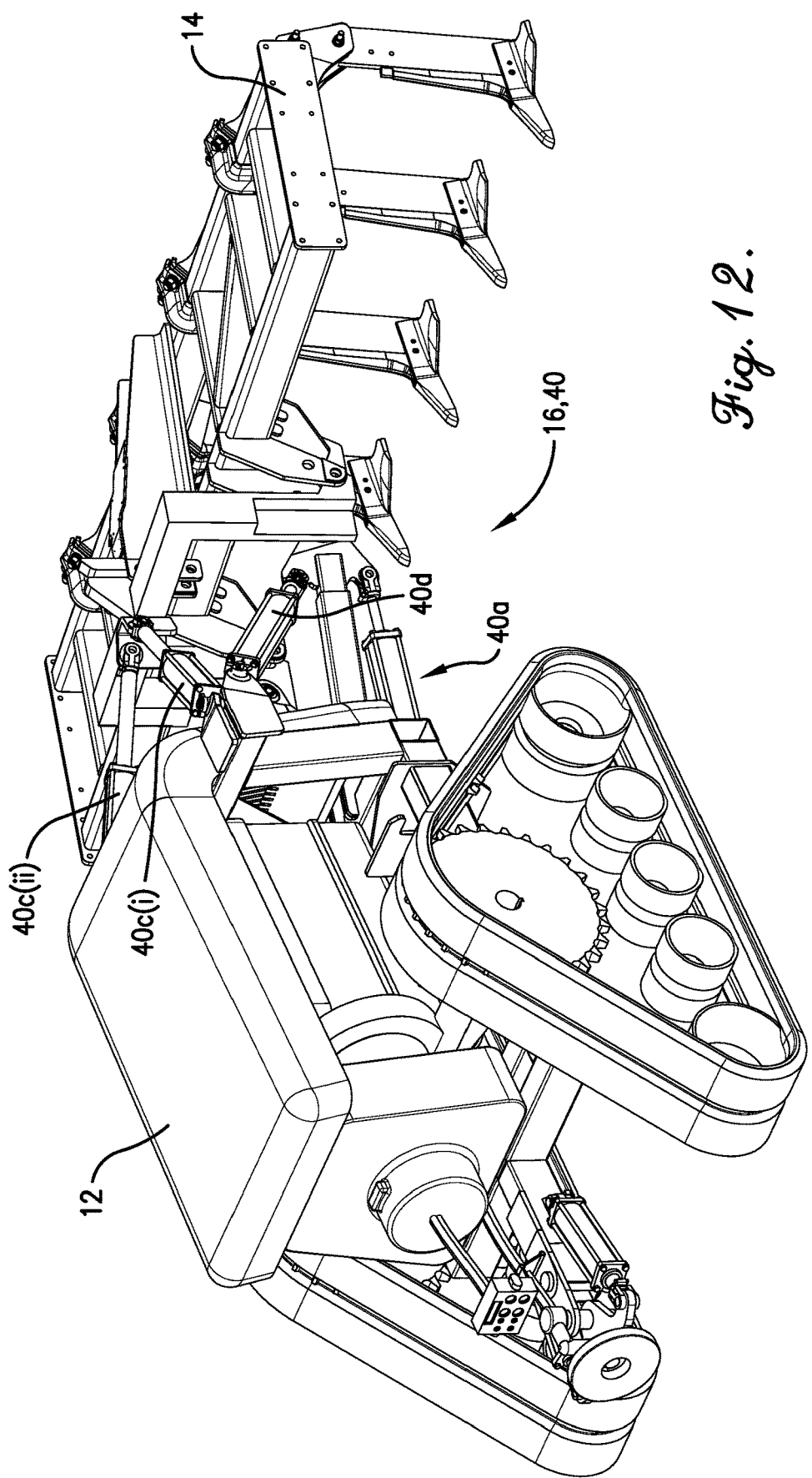
FIG. 12 is a rear perspective view of the autonomous agricultural system from FIGS. 10 and 11.

Embodiments of the present invention may include another embodiment of a coupling assembly 16 that can be used with and/or that may form part of the autonomous agricultural system 10. Such an embodiment of a coupling system 16, referred to herein as the six-actuator coupler 40, as shown in FIG. 10, may share certain components and configurations with the five-actuator coupler 30 described above. As illustrated, the implement 14 (in the form of a tillage implement) is attached to a front of the power unit 12 via the six-actuator coupler 40. However, the power unit 12 can propel the implement 14 either forward or rearward, as necessary, to perform agricultural operations (e.g., tillage operations). The six-actuator coupler 40 may include similar links and/or actuators as included with the five-actuator coupler 30, except that the six-actuator coupler 40 may include six actuators, including (i) two upper links 40c(i), 40c(ii), e.g., which may each comprise an actuator such as a hydraulic cylinder, extending from the power unit 12 to the upper pivot point (e.g., as defined by an upper hitch mount) of coupling element 42, and (ii) the right and left vertical lift actuators 40d, 40e may each extend from the power unit 12 to respective right and left lower hitch points (e.g., as defined by right and left lower hitch mounts) of the coupling element 42.

In more detail, as illustrated in FIGS. 10-14, embodiments of the coupling assembly 16 in the form of the six-actuator coupler 40 may be used to couple an implement 14 to a mobile power unit 12. In certain embodiments, the six-actuator coupler 40 may comprise a right lower link 40a (comprised of a telescopic link element and an associated actuator), a left lower link 40b (comprised of a telescopic link element and an associated actuator), a right vertical lift actuator 40d, and a left vertical actuator 40e. In addition, as will be described in more detail below, the six-actuator coupler 40 may comprise a right upper link 40c(i) (comprising an actuator) and a left upper link 40c(ii) (also comprising an actuator). In such embodiments, the actuators may be linear actuators configured to extend and retract (e.g., telescopically), such as hydraulic cylinders. However, alternative actuator configurations may be used, such as pneumatic cylinders, electric actuators, etc. In some embodiments, the six-actuator coupler 40 may include or be associated with a coupling element 42, such as three-point hitch coupling element, which is connected on one side to the actuators and/or links of the six-actuator coupler 40 and on the other side to the implement 14.

In more detail, the right lower link 40a may extend from the power unit 12 to a right lower hitch point of the coupling element 42. Specifically, each of the telescopic link element and an associated actuator of the right lower link 40a may extend from the power unit 12 to a right lower hitch point of the coupling element 42. In certain embodiments, the right lower hitch point of the coupling element 42 may be associated with a right lower hitch mount that extends from the coupling element 42 for connection with both the telescopic link element and an associated actuator of the right lower link 40a. The telescopic link element of the right lower link 40a may include a base element and an extension element that extends and retracts within the base element. The base element may be connected to the power unit 12, while the extension element may be connected with the coupling element 42. The right vertical lift actuator 40d may extend from the power unit 12 to the right lower hitch mount. As shown in FIG. 10, the actuator of the right lower link 40a may attach to a bottom portion of the right lower hitch mount, while the right vertical lift actuator 40d may attach to an upper portion of the right lower hitch mount. The telescopic link element of the right lower link 40a may be attached to the right lower hitch mount at a location between where the actuator of the right lower link 40a and the right vertical lift actuator 40d attach to the right lower hitch mount. The right lower hitch mount may itself be rigidly or pivotably attached to the coupling element 42, as required. It should be understood that each of the above described connections between the six-actuator coupler 40 and the unit 12 and/or the coupling element 42 may comprise pivot connections. In addition, each of the above-described actuators may be powered hydraulically, electrically, pneumatically, etc.

Similarly, the left lower link 40b may extend from the power unit 12 to a left lower hitch point of the coupling element 42. Specifically, each of telescopic link element and an associated actuator of the left lower link 40b may extend from the power unit 12 to the left lower hitch point of the coupling element 42. In certain embodiments, the left lower hitch point of the coupling element 42 may be associated with a left lower hitch mount (similar to the right lower hitch mount discussed above) that extends from the left lower hitch point for connection with both the telescopic link element and the actuator of the left lower link 40b. The telescopic link element of the left lower link 40b may include a base element and an extension element that extends and retracts within the base element. The base element may be connected to the power unit 12, while the extension element may be connected with the coupling element 42. The left vertical lift actuator 40e may extend from the power unit 12 to the left lower hitch mount. As shown in FIG. 10, the actuator of the left lower link 40b may attach to a bottom portion of the left lower hitch mount, while the left vertical lift actuator 40e may attach to an upper portion of the left lower hitch mount. The telescopic link element of the left lower link 40b may be attached to the left lower hitch mount at a location between where the actuator of the left lower link 40b and the left vertical lift actuator 40e attach to the left lower hitch mount. The left lower hitch mount may itself be rigidly or pivotably attached to the coupling element 42, as required. It should be understood that each of the above described connections between the six-actuator coupler 40 and the unit 12 and/or the coupling element 42 may comprise pivot connections. In addition, each of the above-described actuators may be powered hydraulically, electrically, pneumatically, etc.

In contrast to the five-actuator coupler 30, the right upper link 40c(i) may extend from the power unit 12 to a central, upper hitch point of the coupling element 42. In certain embodiments, the upper hitch point of the coupling element 42 may be associated with an upper hitch mount that extends from the coupling element 42 for connection with each of the right and left upper links 40c(i), 40c(ii). As such, the left upper link 40c(ii) may extend from the power unit 12 to the upper hitch point of the coupling element 40 (as defined by the upper hitch mount). Specifically, the right upper link 40c(i) may attach to a left side of the upper hitch mount, while the left upper link 40c(ii) may attach to a left side of the upper hitch mount. Regardless, each of the right and left upper links 40c(i), 40c(ii) may extend at an angle from the power unit 12 to the upper hitch mount, as will be discussed in more detail below. It should be understood that the connection of the upper links 40c(i), 40c(ii) between the power unit 12 and the coupling element 42 may comprise pivot connections. In addition, the upper links 40c(i), 40c(ii) may be powered hydraulically, electrically, pneumatically, etc.

Figure 13:
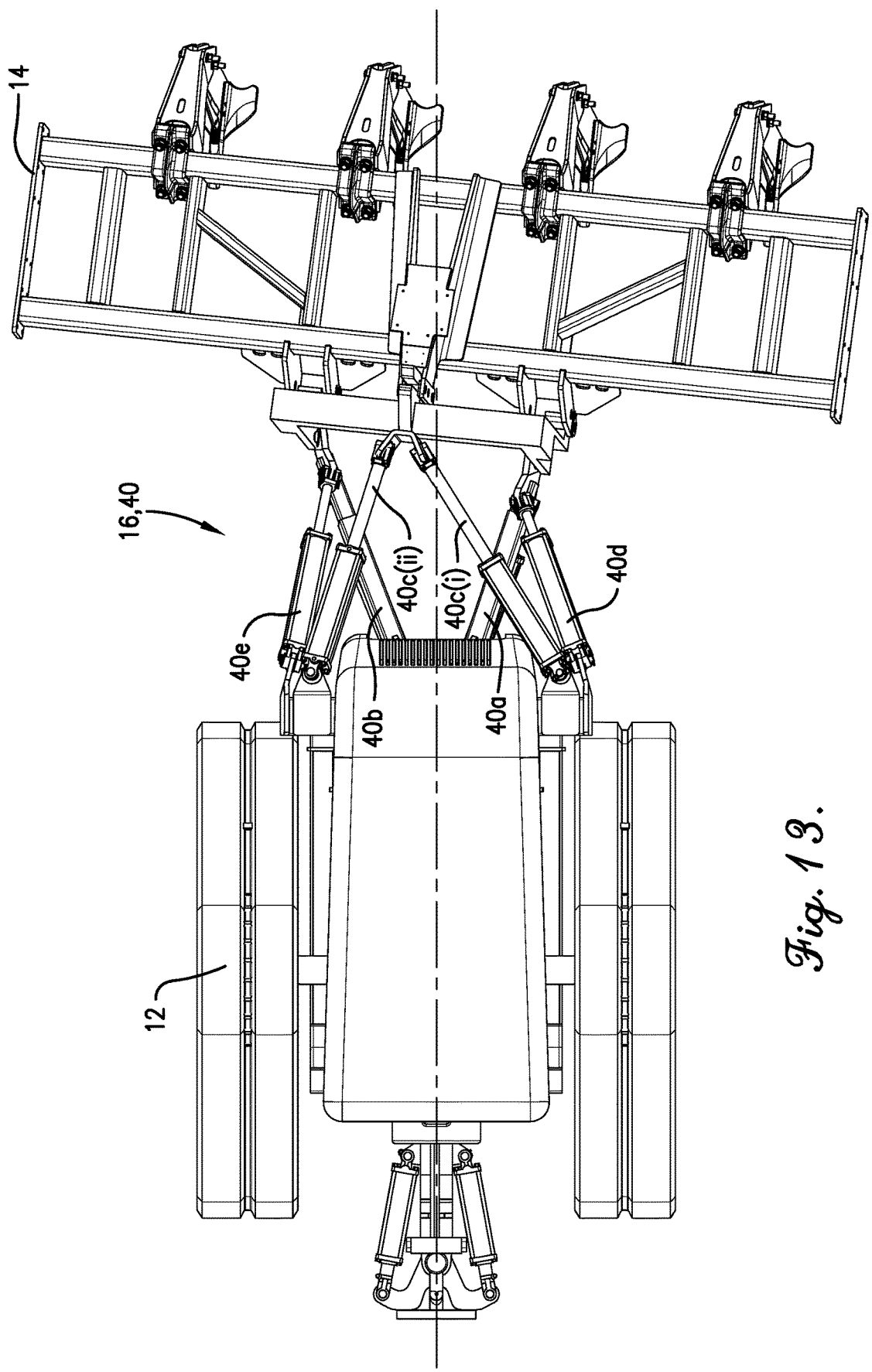
FIG. 13 is a top plan view of the autonomous agricultural system from FIGS. 10-12.
Figure 14:
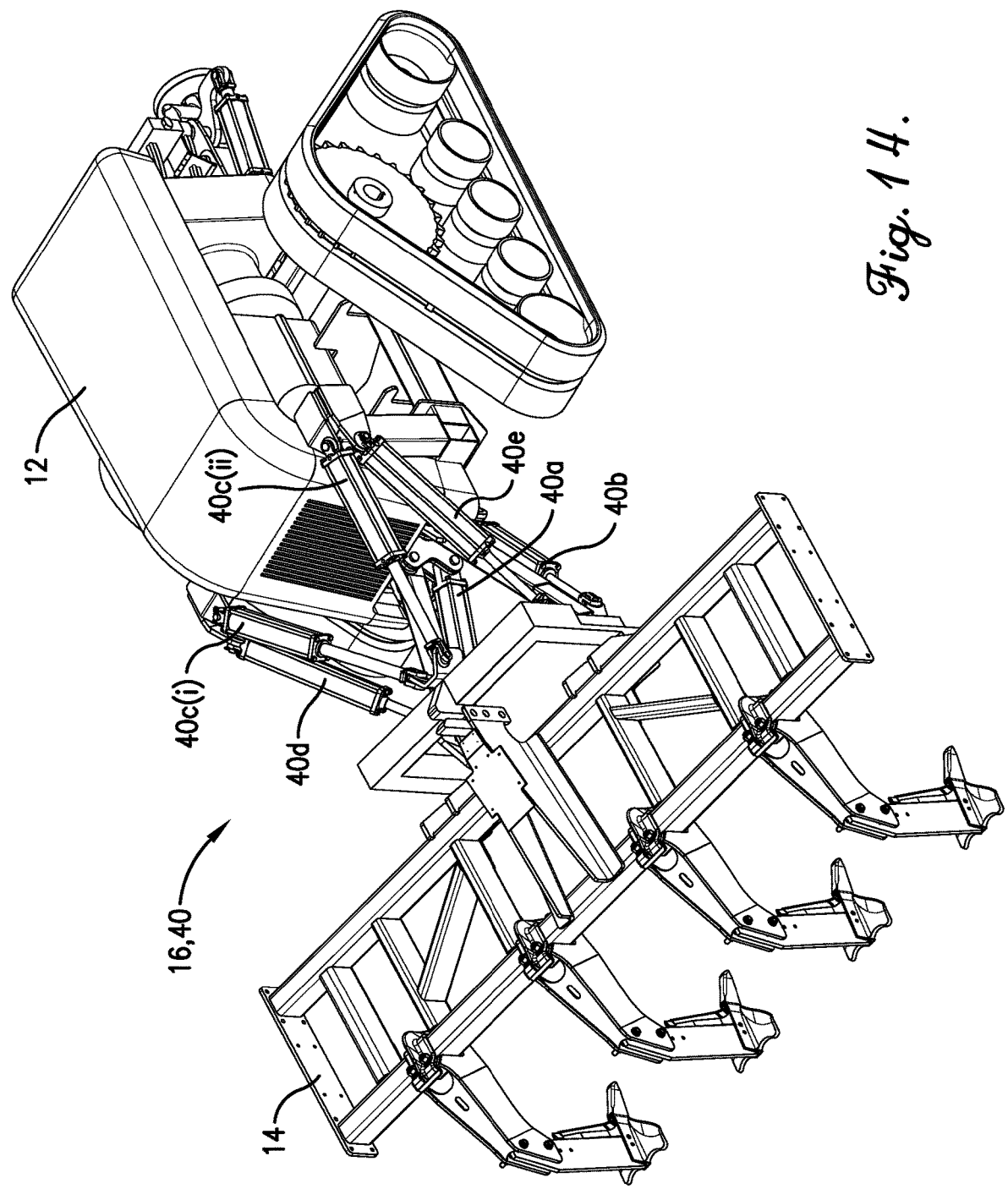
FIG. 14 is another front perspective of the autonomous agricultural system from FIGS. 10-13.

In more detail, as perhaps best illustrated by FIG. 13, the two upper links 40c(i), 40c(ii) may be connected to the power unit 12 at positions further apart from each other and/or from a central reference plane (with such central reference plane being shown in FIG. 13 and extending vertically and through a longitudinal centerline of the power unit 12) than the positions at which the upper links are connected with the coupling element 42. As such, the upper links 40c(i), 40c(ii) are positioned closer together as the upper links 40c(i), 40c(ii) extend from the power unit 12 to the coupling element 42 and/or the implement 14. Similarly, the two vertical lift actuators 40d, 40e may be connected to the power unit 12 at positions further apart from each other and/or from the central reference plane than the positions at which the vertical lift actuators 40d, 40e are connected with the coupling element 42. As such, the vertical lift actuators 40d, 40e are positioned closer together as the vertical lift actuators 40d, 40e extend from the power unit 12 to the coupling element 42 and/or the implement 14. In contrast, the two lower links 40a, 40b may be connected to the power unit 12 at positions closer together and/or to the central reference plane than the positions at which the lower links 40a, 40b are connected with the coupling element 42. As such, the lower links 40a, 40b are positioned further apart as the lower links 40a, 40b extend from the power unit 12 to the coupling element 42 and/or the implement 14.

Thus, when viewing the six-actuator coupler 40 from the top, the two upper links 40c(i), 40c(ii) extend at different angles than the two lower links 40a, 40b, such that from the top plan view, the right upper link 40c(i) intersects the right lower link 40a and the left upper link 40c(ii) intersects the left lower link 40b. Similarly, the two vertical lift actuators 40d, 40e extend at different angles than the two lower links 40a, 40b, such that from the top plan view, the right vertical lift actuator 40d intersects the right lower link 40a and the left vertical lift actuator 40e intersects the left lower link 40b. Such an arrangement of the links and/or actuators is quite stable and allows the six-actuator coupler 40 to stabilize and control the left/right positioning of the coupling element 42 and/or the implement 14. It should be noted that the upper links 40c(i), 40c(ii) may, alternatively, grow further apart as they extend from the power unit 12 to the coupling element 42, while the lower links 40a, 40b may grow closer together as they extend from the power unit 12 to the coupling element 42.

In some alternative embodiments, the vertical lift actuators 40d, 40e may be positioned at generally the same distance from the central reference plane as the vertical lift actuators 40d, 40e extend from the power unit 12 to the coupling element 42 and/or the implement. Stated differently, the lifting actuators may each extend generally longitudinally away from the power unit 12 to the coupler 42. As such, the vertical lift actuators 40d, 40e may extend in a generally parallel manner with respect to each other (and with the central reference plane). Such a configuration permits a vertical raise/lower force without being substantial contributors to the lateral (e.g., sideways) stability of the coupling element 42 and/or implement 14. Regardless, in other embodiments as was discussed above, the vertical lift actuators 40d, 40e may extend at an angle with respect to the central reference plane, such that the vertical lift actuators 40d, 40e grow closer together (or further apart) as the vertical lift actuators 40d, 40e extend from the power unit 12 to the coupling element 42 and/or the implement 14.

In view of the above, the coupling assembly 16 (including the five-actuator coupler 30 and/or the six-actuator coupler 40) can be configured as a series of triangular trusses comprised of the associated links and/or actuators arranged in alternating tip/base-tip/base fashion extending between the power unit 12 and the coupling element 32, 42. Referring to the six-actuator coupler 40 shown in FIGS. 10-14 in particular, the alternating triangular structure between the upper links 40c(i), 40c(ii) (growing closer together as the upper links 40c(i), 40c(ii) extend from the power unit 12 to the implement 14) and the lower links 40a, 40b (growing further apart as the lower links 40a, 40b extend from the power unit 12 to the implement 14) can achieve a preferential rigidity of position needed to orient and place the implement 14 with respect to the power unit 12. Such embodiments also beneficially transfer draft loads of the lower links 40a, 40b to the center of the power unit 12 which has less effect on the directional stability of the power unit 12 versus if the draft loaders were carried to wide positions on the power unit 12.

It should be understood that the lower links 40a, 40b of the six-actuator coupler 40 (or of the five-actuator coupler 30) may be configured to only include the actuators, and not the telescopic link elements. As such, the six-actuator coupler 40 would only have the six actuators between the power unit 12 and the coupling element 42 for attaching and controlling the implement 14. However, use of the telescopic link elements may be helpful for redundancy and stability in case of drastic actuator failure. The telescopic link elements also simplify the attachment of the lower links 40a, 40b at the implement 14 coupling element 42 end by forcing the orientation of the attaching locations on the mounts of the coupling element 42. Without the telescopic link elements holding the geometry, the actuators may have to use full spherical ball ends to connect to the coupling elements 42 rather than a pin through a ball swivel end.

Figure 15:
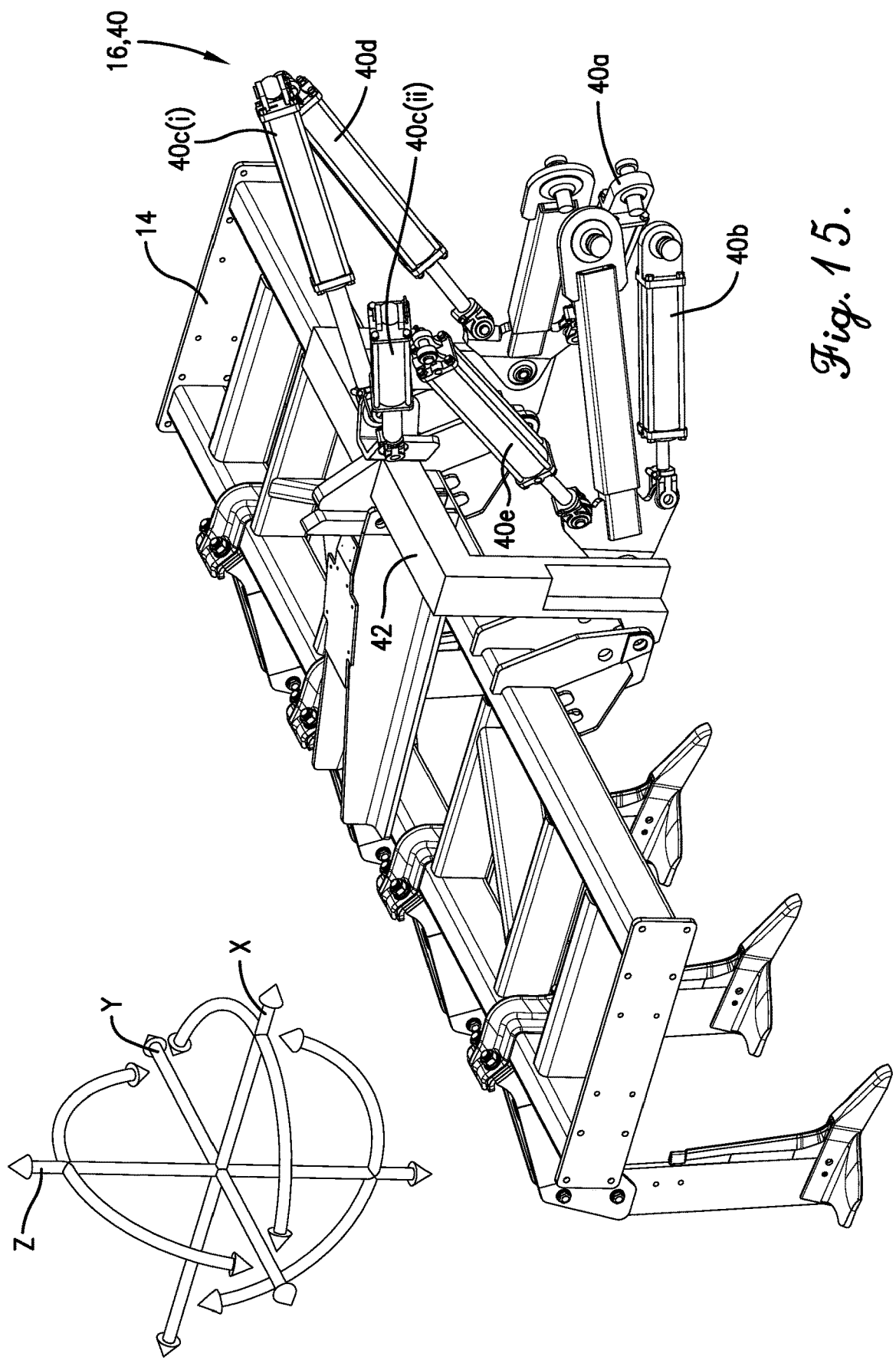
FIG. 15 is a side perspective of the agricultural implement and the coupling assembly from the autonomous agricultural system from FIGS. 10-14.

In view of the above, and with reference to FIG. 15 the left and right lower links 40a, 40b can extend/retract to selectively (i) push the entire implement 14 forward, away from the power unit 12, (ii) draw the entire implement 14 rearward, toward the power unit 12, or (iii) draw one side of the implement 14 closer to the power unit 12 than the other side of the implement 14, so as to position the implement 14 (rotated about a vertical yaw axis "z") in an angled orientation with respect to a lateral direction (i.e., with the lateral direction being orthogonal to the direction of travel of the system 10). Similarly, the right and left vertical lift actuators 40d, 40e can selectively (i) raise the entire the coupling element 42 and/or implement 14 upward, away from the ground, (ii) lower the entire implement 14 downward, towards the ground, or (iii) raise/lower one side of the implement 14 away from/toward (or into engagement with) the ground to a greater extent than the other side of the implement 14. As such, the implement 14 may be rotated about a horizontal roll axis "x" that extends generally longitudinally or in general alignment with the direction of travel of the system 10. In addition, the right and left upper links 40c(i), 40c(ii) may simultaneously extend and retract so as to cause the implement 14 to tilt about a horizontal tilt axis "y" that is generally aligned with a lateral direction (i.e., orthogonal to the travel direction of the power unit 12 and implement 14). In addition, however, the right and left upper links 40c(i), 40c(ii) may individually extend and retract so as to aid in tilting the coupling element 42 and the implement 14 from left to right about the yaw axis "z."

In view of the above described embodiment of the six-actuator coupler 40, the coupling element 42 (and thus the implement 14) may be fully supported and controlled by six actuators (e.g., hydraulic cylinders) configured to cooperate to achieve control in six degrees of freedom between the implement 14 and the power unit 12, namely, vertical raise/lower translation (i.e., translate upward and downward about the yaw axis "z"), lateral left/right translation (i.e., translate leftward and rightward (about the tilt axis "y"), longitudinal front/rear translation (i.e., translate forward and rearward about the roll axis "x"), rotate left and/or right about the yaw axis "z" (e.g., yaw control), rotate frontward and rearward about the tilt axis "y" (e.g., tilt, tilt, or pitch control), and rotate left and/or right about the roll axis "x" (e.g., roll control), as illustrated in FIG. 15.

The above-described embodiments of the six-actuator coupler 40 provides various benefits. For example, because the coupling element 42 may comprise a traditional three point "quick hitch," the six-actuator coupler 40 allows compatibility between new power units 12 and implements 14 and traditional or existing implements 14. Adding a drawbar link to the six-actuator coupler 40 allows for functionality of a traditional tractor drawbar. Thus, in one configuration, the six-actuator coupler 40 can be configured to acts as a simple drawbar towing an implement 14 behind it. The implement 14 acts as if it is being towed by a traditional tractor via towbar. In an additional configuration, the six-actuator coupler 40 can be configured to act as a traditional three-point hitch that raises and lowers the mounted implement 14. The mounted implement 14 behaves as if it was connected to a traditional tractor via three-point hitch.

Furthermore, as was described above, the right and left lower links 40a, 40b, the left and right vertical lift actuators 40d, 40e, and the left and right upper links 40c(i), 40c(ii) are configured to extend and retract independently. As such, the six-actuator coupler 40 can be configured to support the implement 14 (e.g., via the coupling element 42 in the form of a three-point hitch) and to provide multiple degrees of freedom, via the links and/or actuators, between the implement 14 and the power unit 12. Specifically, the implement 14 may be fully supported and controlled by the six-actuator coupler 40 to achieve multiple degrees of freedom (e.g., six degrees of freedom) with respect to the power unit 14, namely, vertical raise/lower translation, lateral left/right translation, longitudinal front/rear translation, tilt axis from front to rear (e.g., pitch), roll axis from side to side (e.g., roll), and yaw axis from left to right (e.g., yaw). Although embodiments provide for the six-actuator coupler 40 to control six degrees of movement of the coupling element 42 and implement 14, certain embodiments will permit one or more of the links and/or actuators to "float" so as to reduce or eliminate rigidity when necessary. For example, a typical 3-point mounted planter today will have height gauge wheels that carry the frame through the field. The six-actuator coupler 40 can be configured to lower the planter to a plant position and then float the vertical lift actuators 40d, 40e so that the planter gauge wheels control the planter height rather than the power unit 12 and/or coupling element 42 controlling the height. This is an advantage to allow the use of the new autonomous power unit 12 with older-style implements 14 that may not have built-in sensors.

Furthermore still, the incorporation of the left and right upper links 40c(i), 40c(ii) (in place of a single upper link) permits the use of additional degrees of freedom, including side to side position translation (e.g., about the tilt axis "y") and left to right rotation for turning/steering (e.g., about the yaw axis "z"). This allows the power unit 12 and implement 14 to act together as an articulated joint while turning the overall autonomous agricultural system 10. Such configuration also allows turning bias corrections to be applied through the six-actuator coupler 40 to enhance steering and position control on hillsides and in curves. The turning/steering and the left/right translation control features may also be helpful in bedded irrigation operations where keeping the implement 14 centered on the raised planting bed between the water irrigation furrows is necessary. Such features are valuable as well in cultivation and spraying of emerged crops where keeping the implement 14 from running over or damaging the growing crop is important. During use of the implement 14, sensors on the implement 14 and/or the coupling system 16 (e.g., on each of the actuators) may provide feedback in real-time to the control system 18 to augment the instructions for six-actuator coupler 40 control when in use, helping to fine tune the implement 14 operation. Such sensors and control are described in more detail below.

In some embodiments, the implement 14 may include its own supporting wheels, such that the implement 14 is configured to support at least a portion of its own load (and potentially a portion of the load from the associated power unit 12). In such embodiments, the coupling assembly 16 (whether the five-actuator coupler 30 or the six-actuator coupler 40) can be configured to transfer weight between the associated power unit 12 and the implement 14 by applying force upwards or downwards as needed (e.g., via adjustment of the links and/or actuators of the coupling assembly 16). As such, the power unit 12 and associated implement 14 can be configured to mimic an articulated tractor/vehicle. For example, in some embodiments, the autonomous agricultural system 10 may be composed of two segments, a power unit 12 at the front and an implement 14 at the rear. Thus, the system 10 can use the implement 14 as the rear segment of an articulated tractor. Such a configuration is valuable for operations with high loads where sharing the load between the implement 14 and power unit 12 provides optimal stability, traction, and minimal soil compaction. In some instances, the implement 14 may be too heavy for the power unit 12 to support and control without the above-described load sharing function of the inventive coupling assembly 16. In alternative embodiments, the autonomous agricultural system 10 may be composed of two segments, a power unit 12 at the rear and an implement 14 at the front. Thus, the system 10 can use the implement 14 as the front segment of an articulated tractor.

Figure 16:
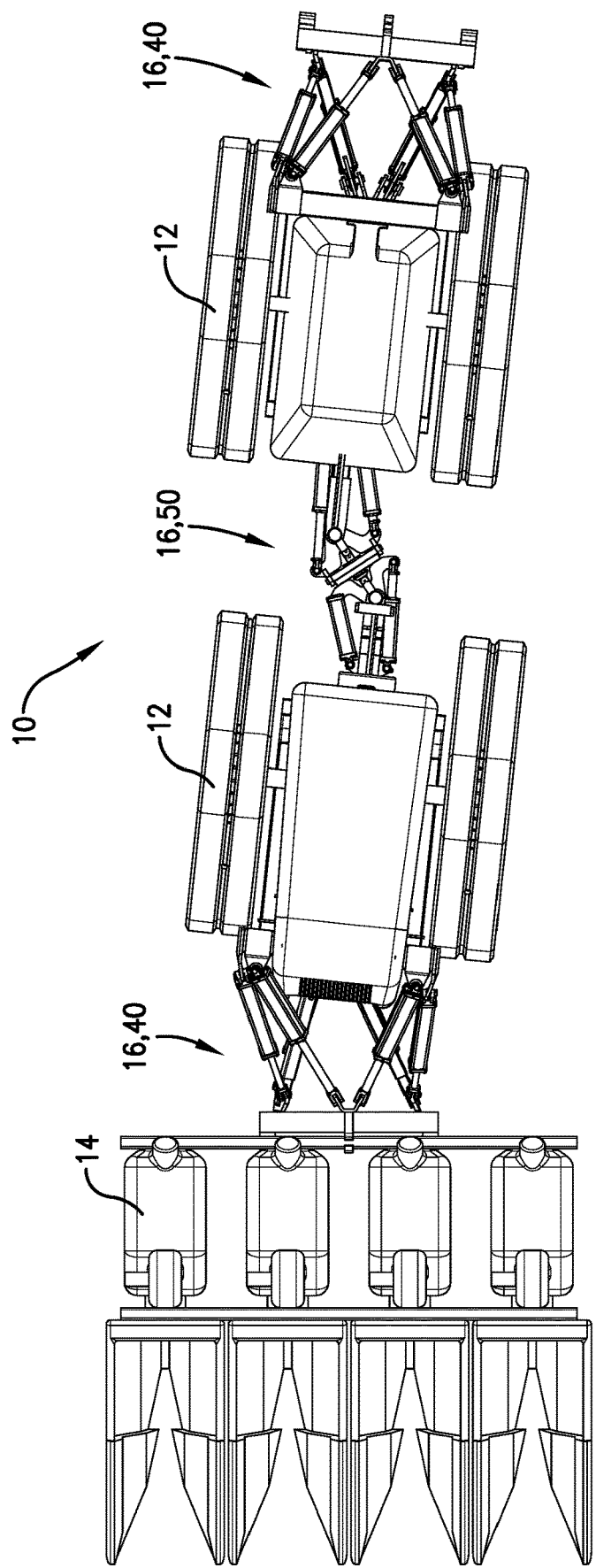
FIG. 16 is another top plan view of the autonomous agricultural system from FIG. 2.
Figure 17:
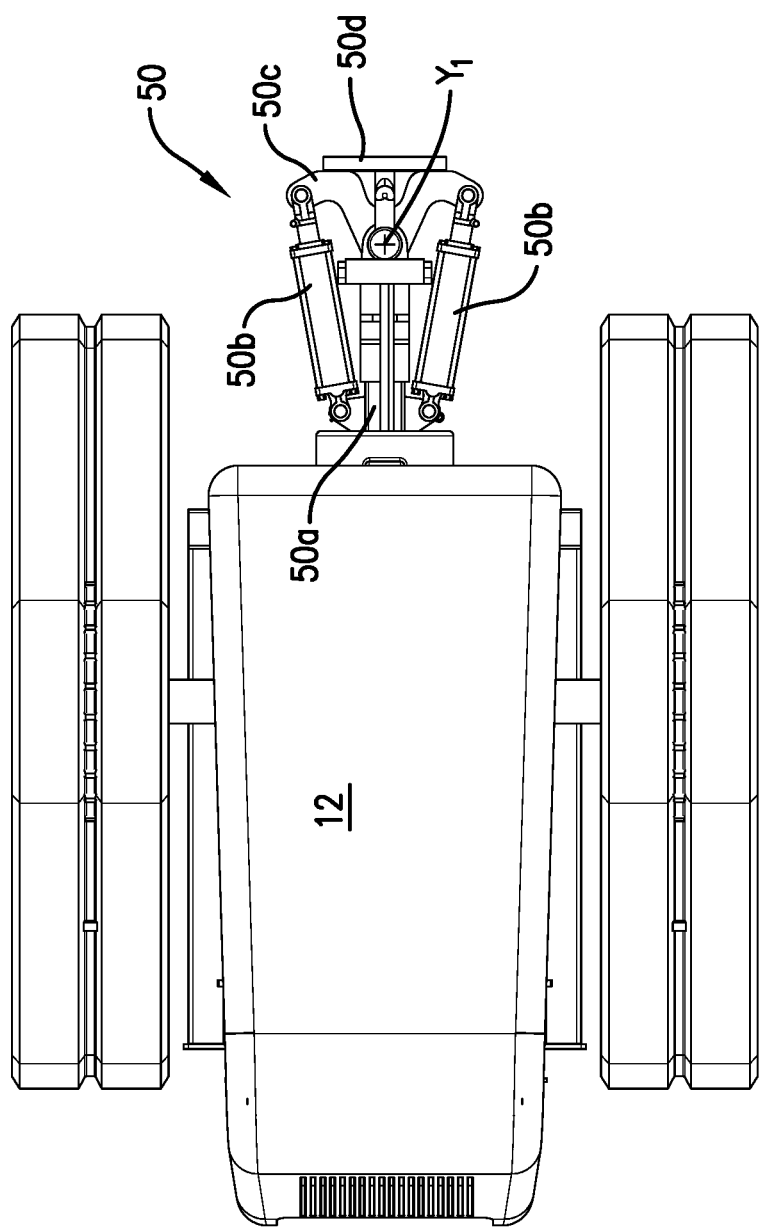
FIG. 17 is a top plan view of a power unit including a coupling assembly in the form of a portion (e.g., one-half) of a twin-pivot articulated hitch.

In certain other embodiments, the inventive autonomous agricultural system 10 may comprise one or more power units 12 that include, at least a portion of, connection assembly 16 in the form of a twin-pivot articulated hitch 50, as illustrated in FIG. 16. In general, twin-pivot articulated hitches 50 may be used to couple together power units 12, such as shown in FIG. 16. For instance, an autonomous agricultural system 10 is shown including a first power unit 12 (a front power unit 12) supporting an implement 14 in the form of a harvester gathering head using a six-actuator coupler 40, such as was described above. A second power unit 12 (a rear power unit 12) is coupled to a rear of the first power unit 12 via a twin-pivot articulated hitch 50. In some embodiments, each power unit 12 may be associated with a portion of and/or one-half of the twin-pivot articulated hitch 50, as illustrated in FIG. 17. Finally, the second power unit 12 may include its own six-actuator coupler 40 to couple with a second implement 14 (not shown) at the rear of the system 10. In some embodiments, a first portion of the twin-pivot articulated hitch 50 (e.g., a first half of the twin-pivot articulated hitch 50) may be releasably attachable to a second portion of the twin-pivot articulated hitch 50 (e.g., the other half of the twin-pivot articulated hitch 50).

In some embodiments, each of the power units 12 may be configured to independently provide power to its drive mechanisms 28 (e.g., wheels, tracks, etc.) as well as to the actuators associated with its portion of the twin-articulated hitch 50 and/or six-actuator coupler 40. As such, each power unit 12 may have its own internal power source (e.g., batteries, combustion engine, etc.). For instance, the actuators and drive mechanism 28 associated with the front power unit 12 may be powered/controlled by a control system 18 and a power source integrated with the front power unit 12. Similarly, the actuators and drive mechanism 28 associated with the rear power unit 12 may be powered/controlled by a control system 18 and power source integrated with the rear power unit 12.

However, in alternative embodiments, one or more of the power units 12 may not include its own internal power source. For example, in some embodiments, the rear power unit 12 may be a towed unit so as to not include its own internal power source. Instead, the rear power unit 12 may receive power from a power source (e.g., batteries, combustion engine, etc.) associated with a front power unit 12. For instance, the rear power unit 12 may include actuators that are powered by the power source of the front unit. Such actuators may include hydraulic cylinders on the six-actuator coupler 40 or motors on the track assembly or tires of the rear power unit 12. Thus, in some embodiments, the actuators associated with the rear power unit 12 (e.g., the towed power unit 12) may be controlled/powered by a control system 18 and power source of the front power unit 12 (e.g., the main power unit). Alternatively, in some embodiments, the actuators associated with the rear power unit 12 (e.g., the towed power unit 12) may be controlled/powered by a control system 18 and/or power source of one of the implements 14 of the autonomous agricultural system 10.

Figure 18:
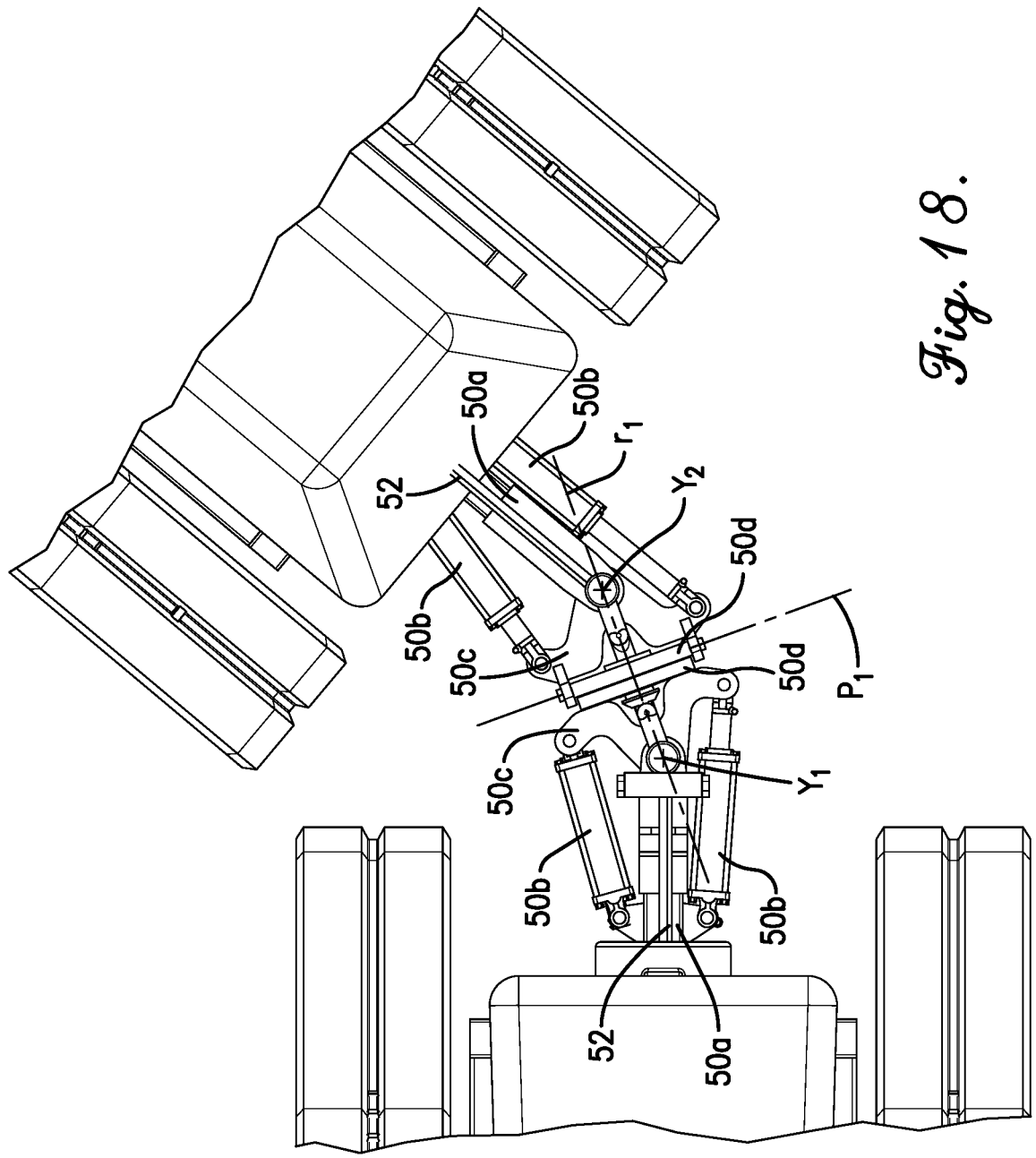
FIG. 18 is a top plan view of portions of two power units connected via a connection assembly in the form of a twin-pivot articulated hitch.
Figure 19:
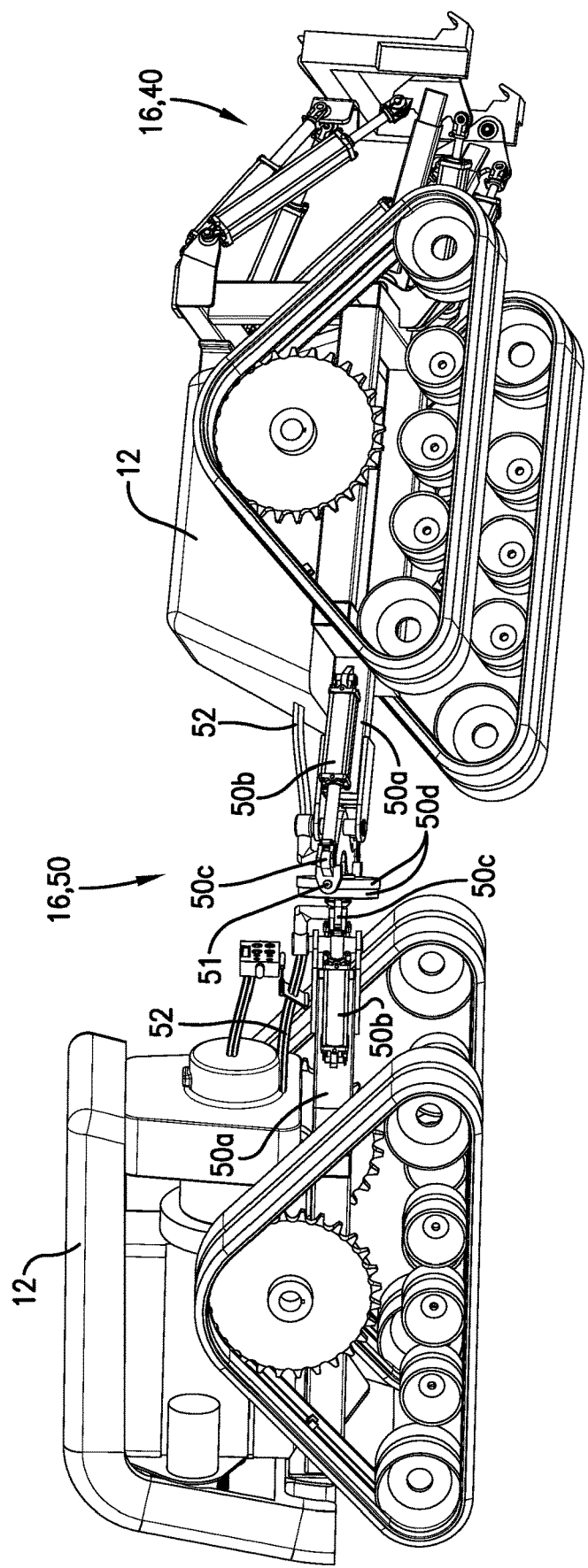
FIG. 19 is a side perspective view of two power units connected via a connection assembly in the form of a twin-pivot articulated hitch.

The twin-pivot articulated hitch 50 may, as illustrated in FIG. 18 be configured to actuate about four axes, including two vertical yaw axes "y1," "y2," one horizontal (longitudinal) roll axis "r1," and one horizontal (lateral) pitch axis "p1." As noted above, each power unit 12 may include a portion of (e.g., one half) of the twin-pivot articulated hitch 50. For example, each power unit 12 may be attached to and/or include a portion of the twin-pivot articulated hitch 50 that includes a base element 50a, a pair of yaw actuators 50b, a yoke 50c, and a roll plate 50d. To connect such components together to form an operable twin-pivot articulated hitch 50, the roll plates 50d associated with each power unit 12 can be secured together, as illustrated in FIGS. 18 and 19. As such, a first pair of yaw actuators 50b (associated with a first power unit 12) can actuate (e.g., extend and retract) so as to shift the associated yoke 50c about the adjacent roll plate 50d, thereby permitting the twin-pivot articulated hitch 50 to actuate about the first yaw axis "y1." It should be noted that the yaw actuators 50b may comprise hydraulic cylinders. However, the yaw actuators 50b may alternatively comprise pneumatic cylinders, electric actuators, or the like. Similarly, a second pair of yaw actuators 50b (associated with a second power unit 12) can actuate so as to rotate the associated yoke 50c about the adjacent roll plate 50d, thereby permitting the twin-pivot articulated hitch 50 to actuate about the second yaw axis "y2." In addition, the pair of roll plates 50d are configured to rotate with respect to each other, such that the twin-pivot articulated hitch 50 can rotate about the roll axis "r1." Furthermore, one of the yokes 50c may be rotatably connected to each side of its associated roll plate 50d via a pitch connection 51 (see FIG. 19), so as to permit the twin-pivot articulated hitch 50 to rotate about the pitch axis "p1."

The ability for the twin-pivot articulated hitch 50 to actuate about four axes allows the autonomous agricultural system 10 with two power units 12 to maintain preferred contact with the ground (e.g., for enhanced traction and/or to minimize floatation). In embodiments in which the power units 12 include drive mechanisms 28 in the form of tracks, the twin-pivot articulated hitch 50 can improve the contact of such tracks with the ground. In view of the above, the twin-pivot articulated hitch 50 facilitates at least four degrees of freedom of movement between power units 12 connected via such a twin-pivot articulated hitch 50.

As illustrated in FIGS. 18 and 19, the twin-pivot articulated hitch 50 may comprise power conduits 52 configured to permit the transfer of power between the coupled power units 12. For example, electrical lines, pneumatic lines, and/or hydraulic lines may extend through such power conduits 52 to permit the transfer of electric, pneumatic, and/or hydraulic power. Such power conduits 52 may extend through the pivot points of the twin-pivot articulated hitch 50 such that power may be transferred even while the hitch 50 actuates about the four axes of rotation. The power conduits 52 may extend through the yokes 50c and the roll plates 50d such that power can be transmitted between power units 12 connected via the twin-pivot articulated hitch 50. Such power transfer can be maintained even while the portions of the twin-pivot articulated hitch 50 actuate during operation of the system 10.

As was noted above, each power unit 12 may include or may be associated with a portion (e.g., one-half) of the twin-pivot articulated hitch 50 (see, e.g., FIG. 17), such that a pair of power units 12 can be coupled together in an operable manner (with the two portions of the twin twin-pivot articulated hitch 50 coming together to form a complete twin-pivot articulated hitch 50). In some embodiments the power units 12 may include automated guidance/coupling mechanisms that permit the portions of the twin-pivot articulated hitch 50 to be connected together in an automated fashion. For example, the power units 12 and/or the portions of the twin-pivot articulated hitch 50 may include position sensors (e.g., cameras, radar sensors, GPS sensors, etc.) for determining relevant positions of the power units 12 and/or portions of the twin-pivot articulated hitch 50 and sending such information to the control system(s) 18 of the power units 12 to control movement of the power units 12 to facilitate connection of the portions of the twin-pivot articulated hitch 50. Nevertheless, each portion of the twin-pivot articulated hitch 50 associated with an individual power unit 12 may be used independently, such as in the form of a traditional drawbar for connection with an implement 14. In such embodiments, the portion of the twin-pivot articulated hitch 50 may be configured to rotate about a single yaw axis (e.g., "y1" or "y2," as applicable). For example, the portion of the twin-pivot articulated hitch 50 shown in FIG. 17 is configured to rotate an attachment 14 (not shown) about yaw axis "y1."

In view of the above, the autonomous agricultural system 50 may be configured to operate in various configurations. For example, as shown in FIG. 17, a single power unit 12 may include a portion of (e.g., one-half) of the twin-pivot articulated hitch 50 for direct connection with an implement (not shown). In such embodiments, the portion of the twin-pivot articulated hitch 50 may function as a skid steer connection and/or a drawbar connection for an associated implement 14. Alternatively, the twin-pivot articulated hitch 50 may be associated with an additional coupler (e.g., a standard drawbar or three-point "quick-hitch") to couple with an implement 14.

Figure 20:
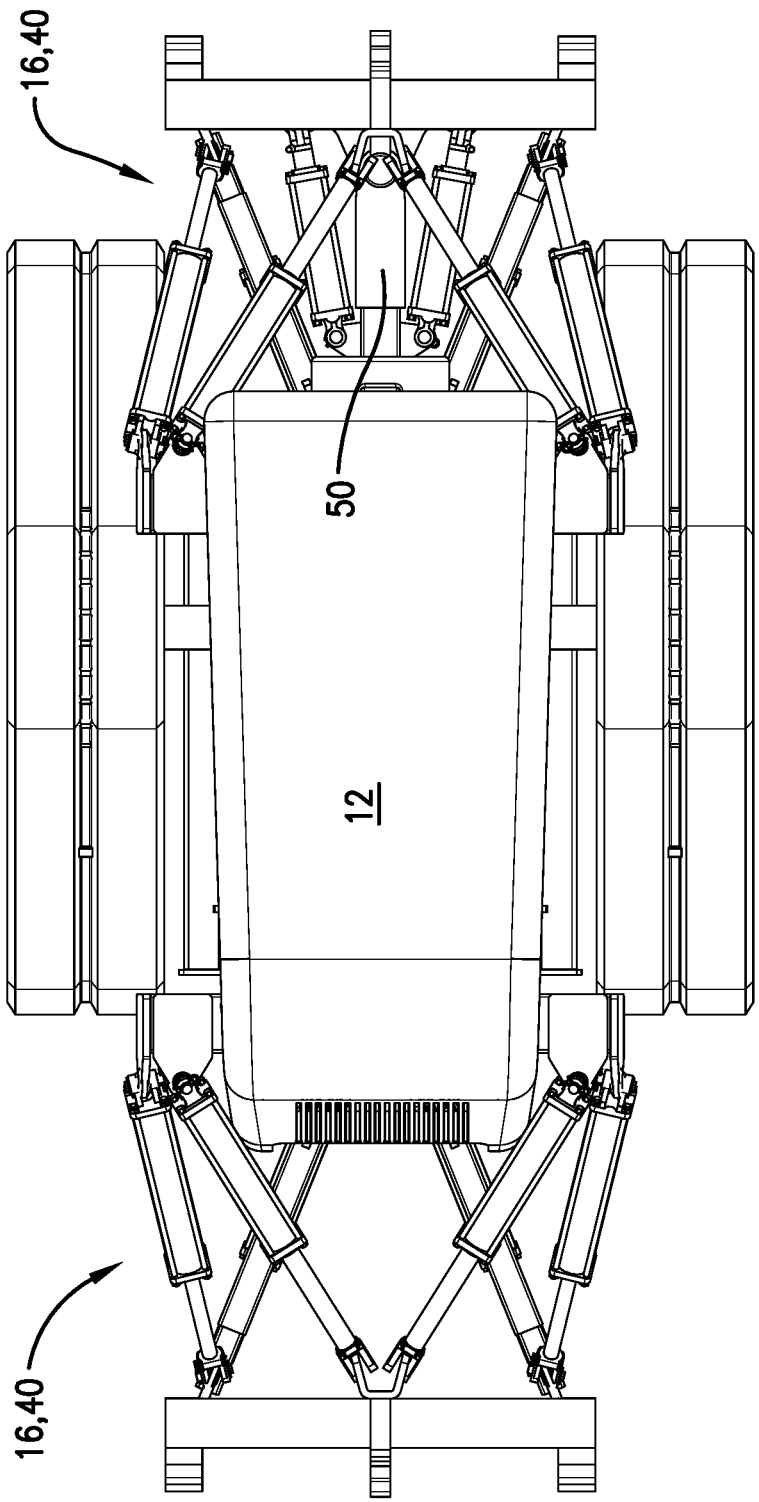
FIG. 20 is a top plan view of a power unit with a pair of coupling assemblies in the form of six-actuator couplers, as well as a portion of a coupling assembly in the form of a portion of a twin-pivot articulated hitch.

Alternatively, a single power unit 12 may include one or more of the six-actuator couplers 40 for operably coupling one or more implements 14. As shown in FIG. 20, for instance, the power unit 12 is shown with a six-actuator coupler 40 on both its front and rear ends, so as to be configured to operably couple with an implement 14 (not shown) on both its front and rear ends. In some embodiments, as shown in FIG. 20, the power unit 12 may simultaneously include a portion (e.g., one-half) of the twin-pivot articulated hitch 50 (on its rear end) in combination with a six-actuator coupler 40 (on its rear end). Alternatively, the power unit 12 may only include a single six-actuator coupler 40 (on either its front or rear end), so as to be configured to operably couple with an implement 14 on either its front or rear end.

As a further alternative, and as was described previously, the autonomous agricultural system 10 may include two or more power units 12 configured to operate in tandem (e.g., linked one behind the other) to operably carry one or more agricultural implements 14 to perform agricultural operations. For instance, as previously shown in FIG. 16, a first power unit 10 can be used to support a first implement 14 at a front of the system 10 via a six-actuator coupler 40, and a second power unit 10 may include a six-actuator coupler 40 to couple with a second implement 14 at the rear of the system 10. Furthermore, the power units 12 may be interconnected (one behind the other) via the twin-pivot articulated hitch 50.

Figure 21:
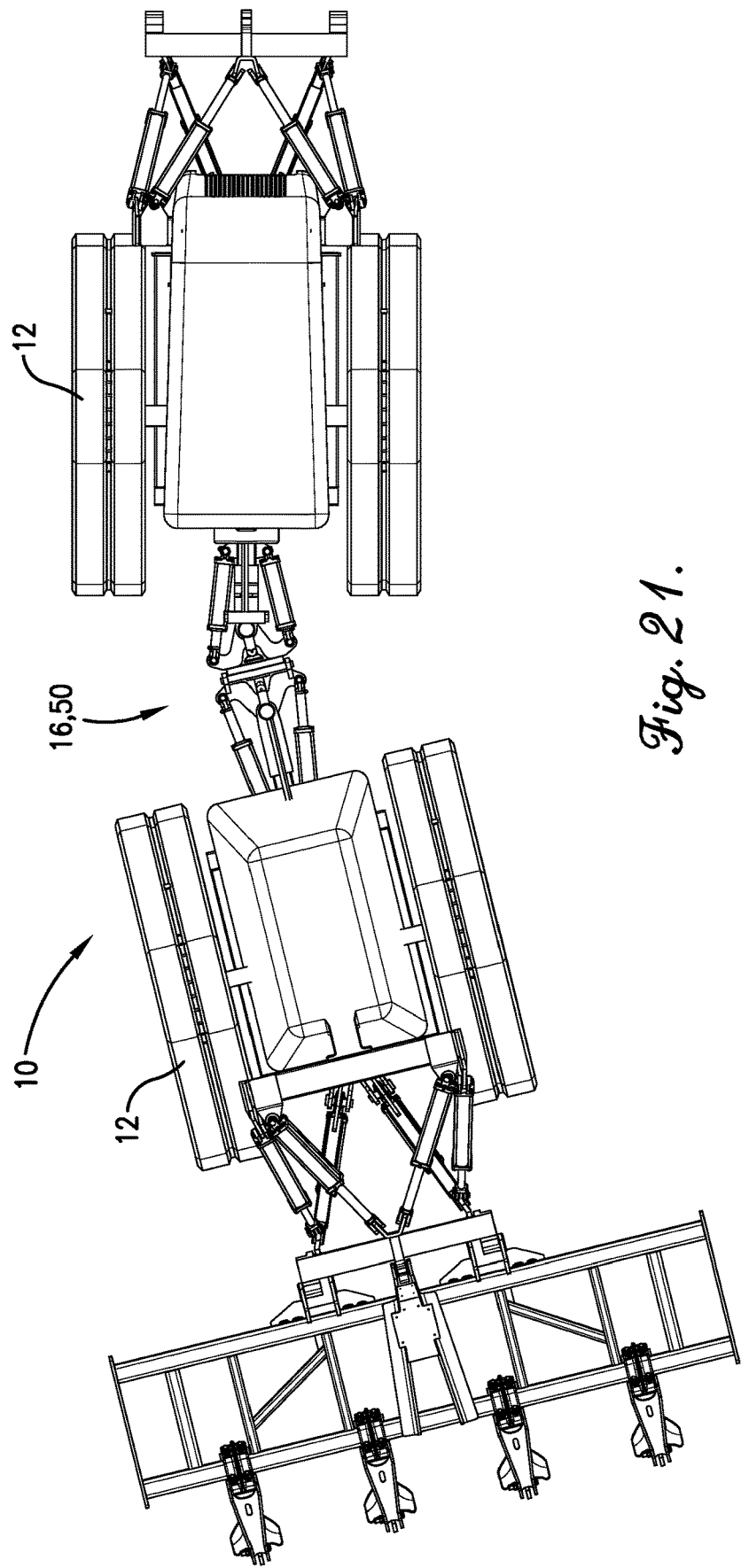
FIG. 21 is another top perspective view of the autonomous agricultural system from FIGS. 2 and 16, with the power units connected via a coupling assembly in the form of a twin-pivot articulated hitch, and with only yaw actuators from one portion of the twin-pivot articulated hitch being used to steer the system.

In some embodiments, the twin-pivot articulated hitch 50 may be used to steer the autonomous agricultural system 10. In some embodiments, only one portion of the twin-pivot articulated hitch 50, e.g., one half of the twin-pivot articulated hitch 50 associated with one of the power units 12 may be configured to actuate (e.g., via the yaw actuators 50b) so as to steer the system 10. Specifically, in such embodiments only the pair of yaw actuators 50b (of the portion of the twin-pivot articulated hitch 50) associated with one of the power units 12 (e.g., the front power unit 12) may be configured to actuate so as to steer the system 10, as illustrated in FIG. 21.

Figure 22:
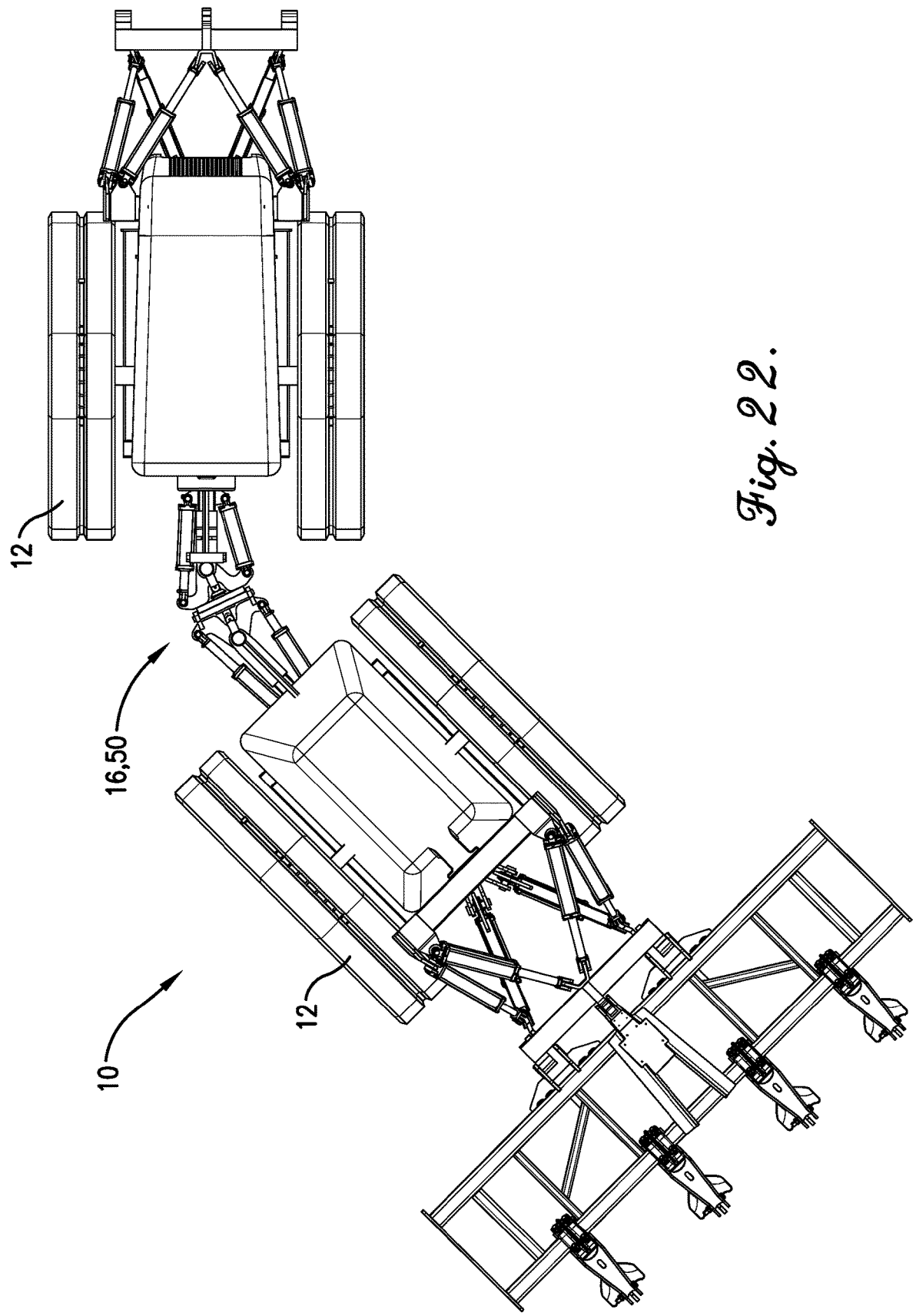
FIG. 22 is another top perspective view of the autonomous agricultural system from FIGS. 2, 16, and 21, with yaw actuators from both portions of the twin-pivot articulated hitch being used to steer the system.

However, in some alternative embodiments, both portions of the twin-pivot articulated hitch 50, e.g., both halves of the twin-pivot articulated hitch 50 associated with each of the power units 12 may be configured to actuate so as to steer the system 10. Specifically, in such embodiments both pairs of yaw actuators 50b associated with each of the power units 12 (e.g., the front power unit 12 and the rear power unit 12) may be configured to actuate so as to steer the system 10, as illustrated in FIG. 22. In such embodiments, the system 10 may be able to be steered more aggressively than in other embodiments (e.g., steered more steeply and/or at more aggressive angles). Nevertheless, each of FIGS. 21 and 22 illustrate the system 10 being steered using "conventional steering" whereby each portion of the twin-pivot articulated hitch 50 is rotated via the yaw actuators 50b in similar directions (or not rotated at all) about the yaw axes "y1" and "y2." Thus, for example, each of the yaw axes "y1" and "y2" may be positioned off to the same lateral side (or in line with) the longitudinal centerline of the system 10 as measured based on one of the front or the rear power units 12 that are interconnected via the twin-pivot articulated hitch 50.

Figure 23:
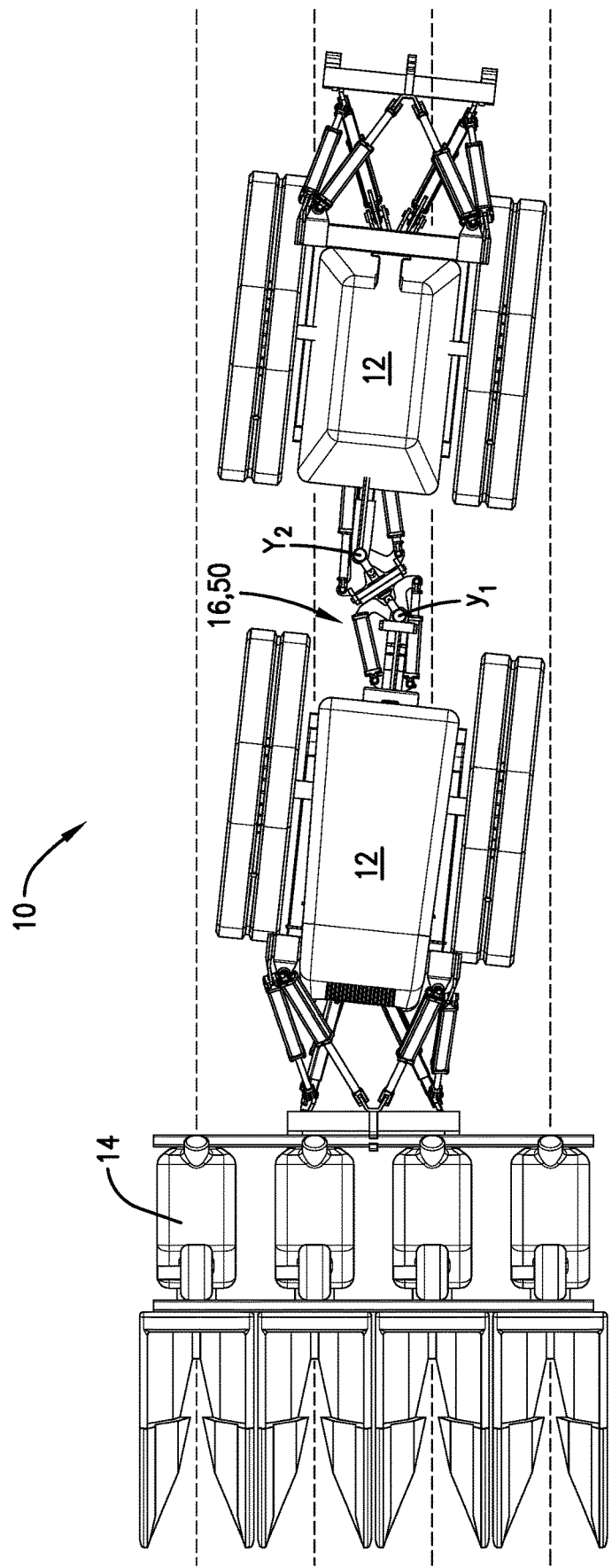
FIG. 23 is another top perspective view of the autonomous agricultural system from FIGS. 2, 16, 21, and 22 with yaw actuators from both portions of the twin-pivot articulated hitch being used to steer the system in an offset manner to configure the system in a crab steer mode.

In contrast, both pair of yaw actuators 50b of the twin-pivot articulated hitch 50 may be configured to actuate to assist with steering the system 10 in a "crab steering" arrangement. As used herein, the term "crab steering" is meant to refer to a steering configuration in which one, both, and/or all of the power units 12 of the autonomous agricultural system 10 are oriented (i.e., as measured by a longitudinal centerline of the power unit(s) 12) at an angle with respect to a direction of travel of the system 10. In some embodiments, the direction of travel of the system 10 will be generally parallel with the crop rows or furrows of the field, as illustrated in FIG. 23. Nevertheless, due to the orientation of the power units 12, as maintained by the twin-pivot articulated hitch 50, the drive mechanisms 28 of the power units 12 will not cross the crop rows or furrows, thereby avoiding potential damage to the crop rows or furrows. Such capability is permitted via use of both pairs of yaw actuators 50b of the twin-pivot articulated hitch 50 being configured to assist with steering the system 10. Specifically, the portions of the twin-pivot articulated hitch 50 from each power unit 12 are actuated, via the yaw actuators 50b, so as to be "offset" from each other, thereby permitting the system (e.g., the power units 12 and/or implements 14) to stay aligned with (in the case of the implements 14) on in between (in case of the drive mechanisms of the power units 12) the crop rows or furrows. The portions of the twin-pivot articulated hitch 50 being "offset" means that the yaw actuators 50b are actuated such that the yaw axes "y1" and "y2" are laterally offset from each other (e.g., on opposite sides of a longitudinal centerline of the overall autonomous agricultural system 10 as measured based on both the front and the rear the power units 12 interconnected via the twin-pivot articulated hitch 50, as illustrated in FIG. 23).

In some embodiments, crab steering may be used when operating the autonomous agricultural system 10 across steep hillsides. In such conditions the power units 12 may unintentionally slide downhill (at least slightly) as the system 10 travels across the slope. The use of crab steering will keep the system 10 directed along an intended direction of travel while avoiding running over the crop rows. Crab steering may also be used when the implement 14 load is off-center versus the power unit(s) 12, thereby causing the power unit(s) 12 to need to resist such load while maintaining a particular direction of travel.

Figure 24:
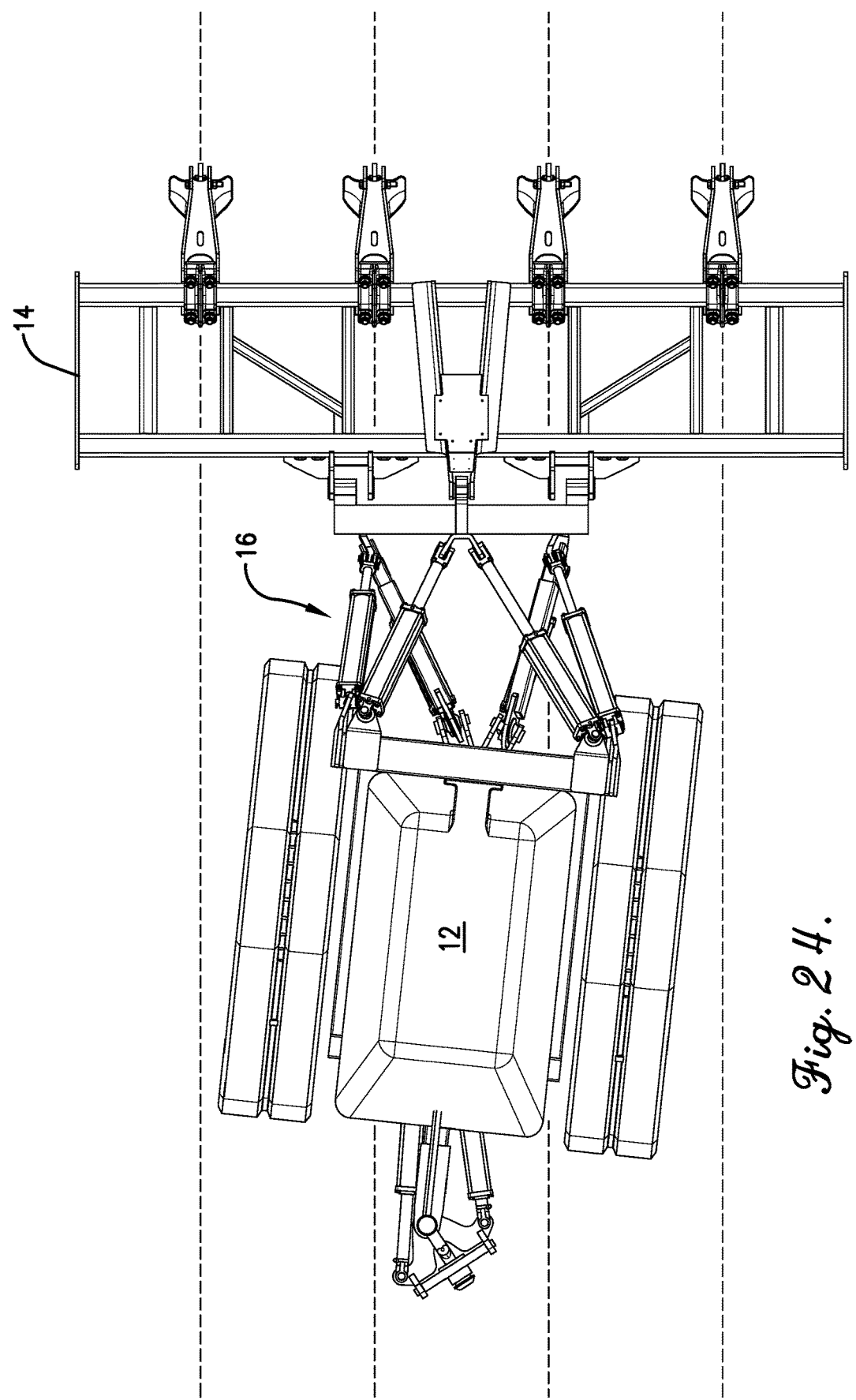
FIG. 24 is another top plan view of the agricultural implement and the coupling assembly from the autonomous agricultural system from FIGS. 10-14 being used in a field of crop rows or furrows.

In view of the above, benefits of the autonomous agricultural system 10 being configured to use the twin-pivot articulated hitch 50 for steering in conjunction with one or more six-actuator couplers 40 to support implements 14 may include: (1) a six-actuator coupler 40 being used to hold an implement 14 at an offset angle from the power unit 12 to maintain the implement 14 on intended rows even while the power unit 12 is orientated at angle with respect to the direction of travel of the system 10 as in a crab steering configuration (see, e.g., FIG. 24 with the front power unit 12 of the crab steering configuration not shown), (2) six-actuator couplers 40 being adjusted in combination with the twin-pivot articulated hitch 50 steering to hold the one or more implements 14 in intended positions (see, e.g., FIG. 23), (3) six-actuator couplers 40 being adjusted in combination with the twin-pivot articulated hitch 50 steering to hold the one or more implements in intended positions 50 and to keep the drive mechanisms 28 of the power units 12 off crop rows/furrows (see, e.g., FIG. 23), (4) enhancing implement 14 coverage and application rate accuracy (e.g., sprayer-type implements 14 that apply treatment to crop or soil), and (5) offsetting effects of the power units 12 and/or implements 14 to facilitate steering corrections, and (6) keeping implement 14 level to ground or at desired depth even over undulating terrain.

In view of the above, embodiments of the present invention include a method of using an autonomous agricultural system 10 to perform agricultural operations. The method may include simultaneously operating a plurality of actuators of a coupling assembly 16 to control multiple orientation parameters of the implement 14. Such multiple orientation parameters may provide at least six degrees of freedom of movement of the implement 14 with respect to the power unit 12. In some embodiments, such simultaneously operating step may be performed to conform the implement 14 to uneven terrain. In some embodiments, such simultaneously operating step may be performed to accurately position/orientate the implement 14 during steering operations of the system 10. In some embodiments, such simultaneously operating step may be performed to shift the implement 14 laterally from side to side to improve location accuracy of the implement 14, which is positioned in front of or following the power unit 12. The side to side shifting may be used when traversing hillsides to prevent the implement 14 from drifting down a hillside and/or off a target line. In some embodiments, such simultaneously operating step may be performed to shift the implement 14 longitudinally from front to back to adjust a center of gravity of the implement 14, the power unit 12, and/or the overall system 10. As such, the front to back shifting may be used during operations/transportation to enhance stability of the implement 14, the power unit 12, and/or the overall system 10. In some embodiments, such simultaneously operating step may be performed to transfer weight between the power unit 12 and the implement 14. In some embodiments, the weight transfer may be used to optimize traction, compaction, or combinations thereof of the system 10.

Figure 25:
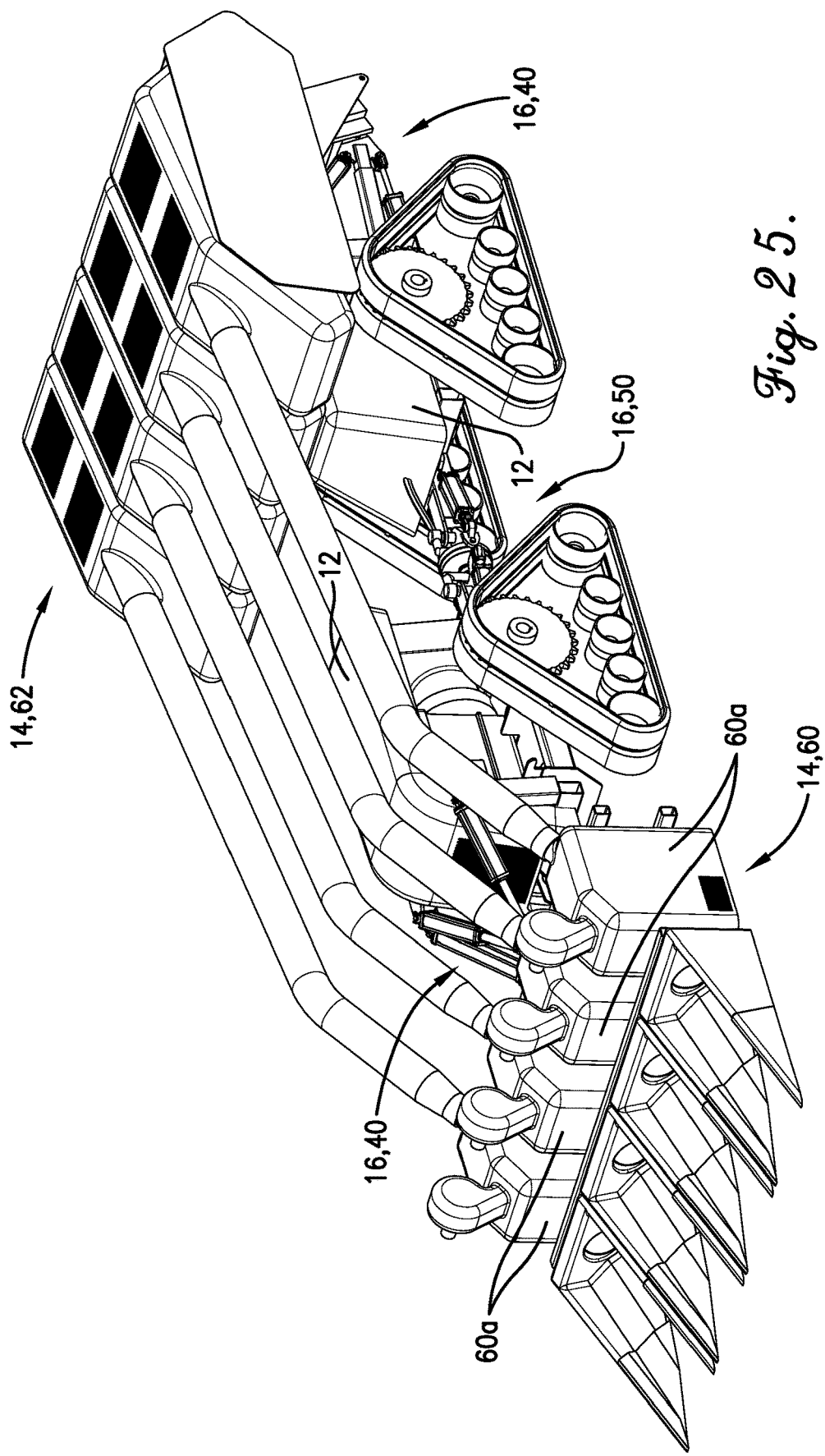
FIG. 25 is a perspective view of an autonomous agricultural system according to embodiments of the present invention, with the system including multiple agricultural implements being used for harvesting operations and with each agricultural implement being coupled to a power unit via a coupling assembly.
Figure 26:
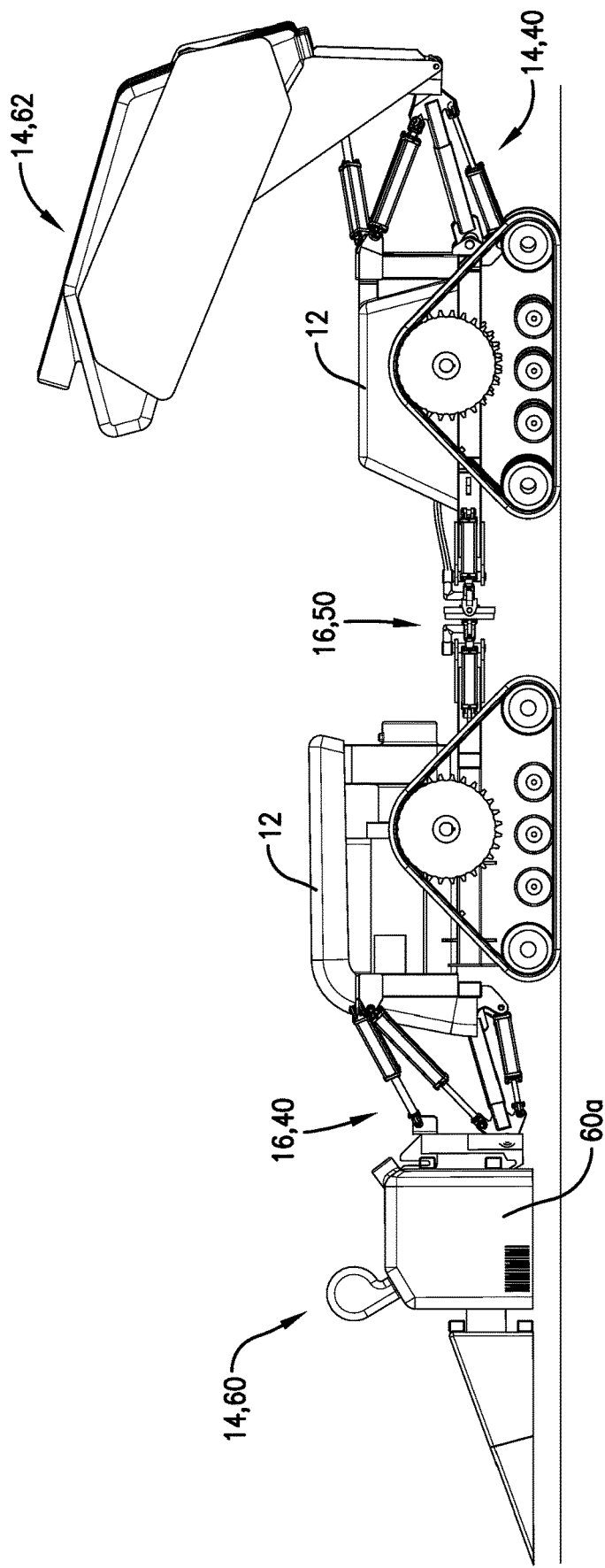
FIG. 26 is a side elevation view of the autonomous agricultural system from FIG. 26.

The autonomous agricultural system 10 of embodiments of the present invention, e.g., as configured for use with the twin-pivot articulated hitch 50 and one or more six-actuator couplers 40 may particularly be used for agricultural operations in the form of crop harvesting. For example, as illustrated in FIGS. 25 and 26, the autonomous agricultural system 10 may include a first (forward) power unit 12 with a six-actuator coupler 40 that can support an implement 14 in the form of a gathering head 60 for gathering crop growing in rows. Due to the us of the six-actuator coupler 40, embodiments may provide for the gathering head 60 to be shifted about a yaw angle, as well as lateral/side shift position control (as well as any other angles permitted by the six-actuator couplers 40). The autonomous agricultural system 10 may additionally include a second (rearward) power unit 12 with a six-actuator coupler 40 that is supporting an implement in the form of a bin 62 for holding crop that has been harvested via the gathering head 60. The power units 12 may be connected together via a twin-pivot articulated hitch 50 for linking and/or steering.

As illustrated above, the gathering head 60 may include a plurality of row processing assemblies 60a, with each row processing assembly being configured to gather crop from a given row in the field. Specifically, each row processing assembly 60a may include one or more gathering blades and an individual row container for initially receiving crop from the associated row. The row container may include a pneumatic fan configured to force the crop from the row container to the bin 62 via a pneumatic convey lines. The fan may also be used to assist with separating and cleaning crop (e.g., grain). Some embodiments may provide for the system 10 to include other separating elements to aid in separating and/or cleaning crop, such as a rotor and concave sieve. Each of the row assemblies 60a may additionally include analysis elements, such as sensors, computing devices (e.g., processors, memory elements, communications elements, etc.), and the like for performing analyses on the crops collected by the individual row assembly. Such analysis elements may be used to perform crop yield analyses per row, grain property analysis (e.g., moisture content, crop identification, mold identification, etc.) per row, and other various types of crop analysis on a row basis.

In some embodiments, the bin 62 may be divided up into a plurality of bin sections, with each bin section configured to receive crop from an individual row processing assembly 60a. In addition, as illustrated in FIG. 26, the bin 62 may be associated with a hydraulic lift (e.g., one or more hydraulic cylinders) for tilting the bin 62 with respect to the second power unit 12 so to allow gravity discharge unloading of the crop stored in the bin 62. In some further embodiments, the bin 62 may be divided up into two (or more) primary compartments, with each compartment intended to receive a separate variety of grain or grain having a particular property (as perhaps determined by the analysis elements of the row assemblies 60a). For example, each row assembly 60a may be associated with individual pneumatic convey lines for directing crop to one of the primary compartments of the bin based on a crop property determined by the analysis element of the row assembly 60a. Each row assembly 60a may additionally include a pneumatic switching valve configured to direct the crop to one of the two primary compartments.

In some further embodiments, the harvesting-type autonomous agricultural system 10 may be associated with a bagging system instead of or in addition to a bin 62. In such embodiments, each pneumatic convey line extending from the individual row assemblies 60a may be directed to the bagging system to bag the crop obtained from each crop row (i.e., by an individual row assembly). The bags may be formed from breathable "GORE-TEX" material to allow drying and prevent spoilage.

In some embodiments, the autonomous agricultural system 10 may be associated with a GPS system configured to identify the geolocation where each bag of crop material is formed and/or dropped. For each bag of crop material, the autonomous agricultural system 10 may be configured to generate either or both of: (1) a virtual tag that is generated and stored on a control system 18 (e.g., a computing device with processing elements and/or memory elements) associated with the autonomous agricultural system 10, and (2) a physical tag that is generated and associated with the bag (e.g., placed on or in the bag). In more detail, each bag of crop material may be associated with a physical tag that can be used to identifies that location where the bag was dropped (once filled) from the autonomous agricultural system 10. The physical tag may be an RFID tag, QR Code, or the like. The physical tags may also include various other information related to the crop contained in the bags (e.g., crop properties as determined by the analysis elements of the row assemblies 60a), such that the bags can be selectively collected, at a later time, based on such information (e.g., based on crop properties and/or geolocation). In other embodiments, the autonomous agricultural system 10 may include the above-indicated control system 18 for storing the virtual tags for each bag. The virtual tags may identify the location and crop properties of each bag of crop material, such as may be used at a later time for pickup. As such, the bags can be selectively collected, at a later time, based on such information (e.g., based on crop properties and/or geolocation) that is stored virtually, without requiring that physical tags on the bags be scanned. In additional embodiments, crop material of specific property types can be brought in together for optimum market value, without having to visit each bag individually to read the physical tag before deciding whether or not to pick it up.

In view of the above, embodiments of the present invention may include an autonomous agricultural system 10 configured to harvest crop from a field. The autonomous agricultural system 10 may comprise a first autonomous power unit 12 and an implement 14 in the form of a gathering head 60 coupled to the first autonomous power unit 12 via a first coupling assembly 16 (e.g., a six-actuator coupler 40). The gathering head 60 may be configured to harvest crop from individual crop rows of the field. The system 10 may additionally include a second autonomous power unit 12 coupled to the first power unit 10 (e.g., via a coupling assembly 16 in the form of a twin-pivot articulated hitch 50). The system may further include an implement 14 in the form of a bin 62 coupled to the second autonomous power 12 unit via a second coupling assembly (e.g., a six-actuator coupler 40).

Figure 27:
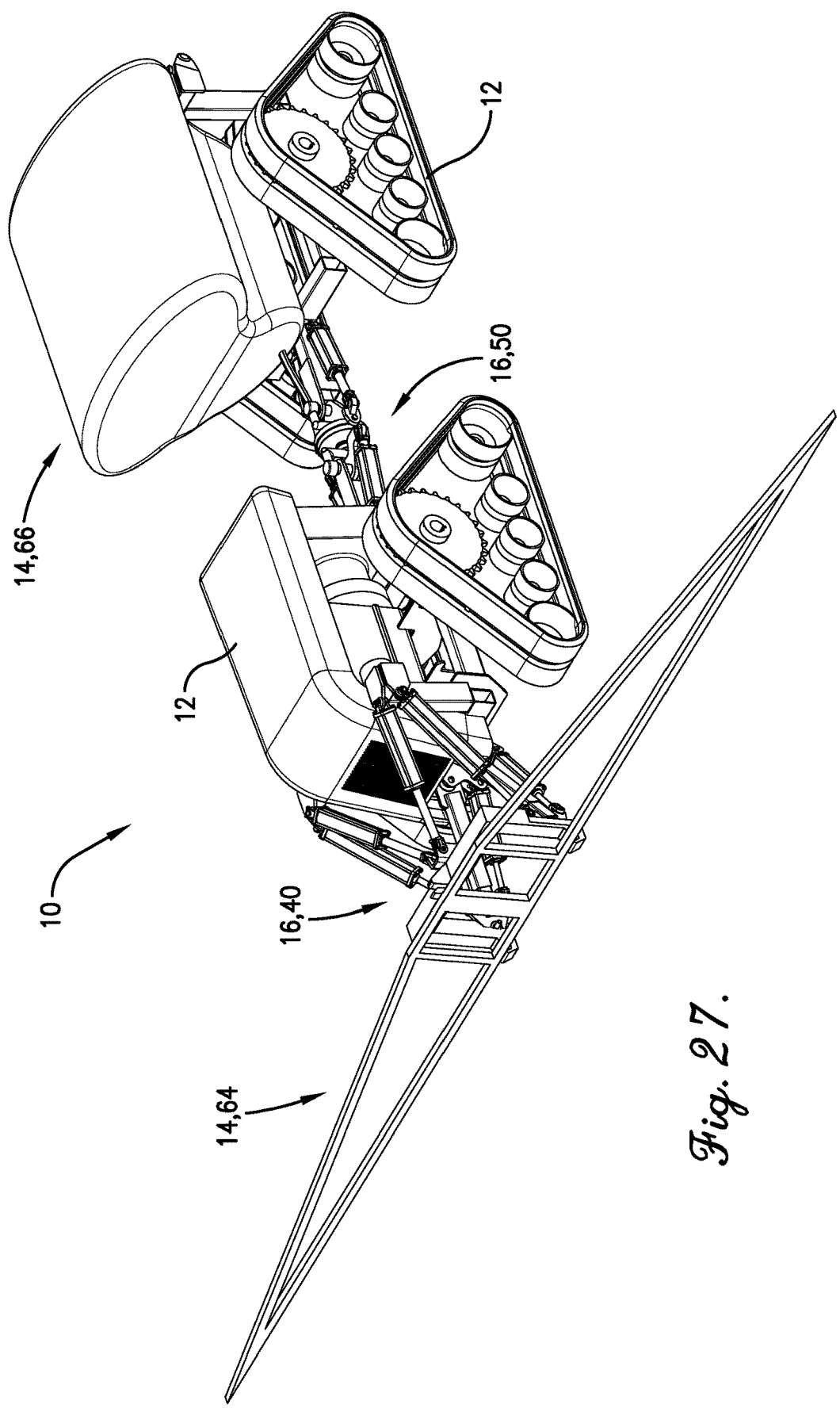
FIG. 27 is a perspective view of an autonomous agricultural system according to embodiments of the present invention, with the system including multiple agricultural implements being used for treatment operations and with each agricultural implement being coupled to a power unit.

The autonomous agricultural system 10 of embodiments of the present invention, e.g., as configured for use with the twin-pivot articulated hitch 50 and one or more six-actuator couplers 40 may also be particularly used for agricultural operations in the form of fertilizer and/or crop treatment operations. For example, as illustrated in FIG. 27, the autonomous agricultural system 10 may include a first (forward) power unit 12 with a six-actuator coupler 40 that is supporting an implement in the form of a sprayer 64 for spraying fertilizer (or other crop treatments) on crops growing in the field (e.g., in rows). Due to the six-actuator coupler 40, embodiments may provide for the sprayer's 64 position and/or orientation to be shifted for accurate spray placement on crops, crop rows, and/or furrows. The autonomous agricultural system 10 may additionally include a second (rearward) power unit 12 that is supporting an implement 14 in the form of a tank 66 for holding the fertilizer (or treatment) being applied by the sprayer 64. The tank 66 may be fluidly connected to the sprayer 64 via one or more fluid lines (not shown). In some embodiments, the tank 66 may be supported by a six-actuator coupler 40 associated with the second power unit 12. Alternatively, or in addition, the tank 66 may be supported on top of the second power unit 12. Finally, the power units 12 may be connected via a twin-pivot articulated hitch 50 for linking and/or steering. However, in some alternative embodiments, only a single power unit 12 may be used to simultaneously support and carry both a sprayer 64 (e.g., on the front of the power unit 12 via a six-actuator coupler 40) and a tank 66 (e.g., on top of and/or on the rear of the power unit 12, such as via a six-actuator coupler 40).

Beneficially, use of a both a front and rear six-actuator couplers 40 (using either a single or tandem power units 12) allows the autonomous agricultural system 10 to keep operations on path for accurate and efficient fertilizing or other crop treatment. Furthermore, such accurate travel paths can be maintained while keeping the drive mechanisms 28 of the power units 12 off the crop rows, as was previously described.

In view of the above, embodiments of the present invention may include an autonomous agricultural system 10 configured to perform agricultural operations in a field. The autonomous agricultural system 10 may comprise a first autonomous power unit 10 and a sprayer 64 coupled to the first autonomous power unit 12 via a first coupling assembly 16 (e.g., a six-actuator coupler 40). The sprayer 64 may be configured to apply treatment to crops of the field. The system 10 may additionally comprise a second autonomous power unit 12 coupled to the first power unit 12 (e.g., via a coupling system 16 in the form of a twin-pivot articulated hitch 50). The system may further comprise an implement 16 in the form of a tank 66 coupled to the second autonomous power unit 12 via a second coupling assembly (e.g., a six-actuator coupler 40).

The autonomous agricultural system 10 of embodiments of the present invention, e.g., as configured for use with the twin-pivot articulated hitch 50 and one or more six-actuator couplers 40 may also be particularly used for agricultural operations in the form of tillage operations or deep placement fertilizing. For example, as illustrated in FIG. 28 the autonomous agricultural system 10 may include a first (forward) power unit 12 with a six-actuator coupler 40 that can support an implement 14 (not shown) in the form of a first tiller (e.g., coulter discs, harrows, rippers, etc.). The autonomous agricultural system 10 may additionally include a second (rearward) power unit 12 with a six-actuator coupler 40 that is supporting an implement 14 (not shown) in the form of a second tiller (e.g., coulter discs, harrows, rippers, etc.). Alternatively, or in addition as shown in FIG. 28, the rearward power unit 12 may support (e.g., on top of the power unit 12) an implement 14 in the form of a tank 66 for holding fertilizer, as well as support (e.g., via a six-actuator coupler 40) an implement 14 in the form of a deep-placement implement 68 for injecting the fertilizer down into the ground. Regardless, due to the six-actuator coupler 40, embodiments may provide for the implement's 14 position and/or orientation to be shifted for accurate tilling and/or fertilizer placement. Finally, the power units 12 may be connected via a twin-pivot articulated hitch 50 for linking and/or steering of the system 10. However, in some embodiments, only a single power unit 12 may be used. Beneficially, use of a both a front and rear six-actuator couplers 40 allows the autonomous agricultural system 10 to keep operations on path for accurate and efficient tilling. Furthermore, such accurate travel paths can be maintained while keeping the drive mechanisms 28 of the power units 12 off the crop rows, as was previously described.

In general, embodiments of the above-described autonomous agricultural system 10 (e.g., with front and rear power unit 12) may be used with various other implements to perform various agricultural operations, including fertilizing, strip till, cultivation, and seed planting. For instance, for planting operations, the front power unit 12 may include a removable rear support/positioning hitch for supporting a tank 66, as well as a rear six-actuator coupler 40 for supporting a separate implement 14. As such, the front power unit 12 itself can carry fertilizer (or seed) in the tank 66 while the front power unit's rear six-actuator coupler 40 can carry an applicator (or planting) tool. The planting tool may comprise one or more disc openers and/or row units for forming furrows and planting seed within the furrows. In some embodiments, the rear power unit 12 can utilize its integrated motor/actuators only for overall tractive/steering effort of the system 10 (i.e., the rear power unit 12 may not support an implement or tank). Alternatively, the rear unit may support an implement 14 (e.g., an additional tank to hold fertilizer or seed) so as to increase output or operational efficiency of the system 10.

In some specific embodiments, the six-actuator coupler 40 can be used to support an implement in the form of a hopper above the power unit 12 (e.g., for planting, treatment applications, or harvesting). The six-actuator coupler 40 may be configured to lower the hopper for ease of filling while collecting harvested crop from a harvester. In addition, the six-actuator coupler 40 may be configured to raise the hopper and/or tilt the hopper to allow gravity assisted unloading at a crop collection point. Such features allow for the elimination of processing the crop with augers or conveyors that can cause grain damage. Additionally, such features allow users to avoid the expense and complexity of augers or conveyors while tendering and transferring harvested crop in the field during the harvest process.

To enable attachment, detachment, and operation of various types of implements 14 (e.g., via the coupling assembly 16), the power unit 12 may be configured to obtain one or more key parameters from the implements 14, which are supplied to the power unit 12 through an implement identification process (e.g., so as to identify implements 14). Such key parameters may, for instance, be stored on a memory element, QR Code, RFID tag, or other sensors associated with the implement 14. As such, the power unit 12 may be configured to obtain (e.g., via data communication, optical scan, electromagnetic scan, etc.) the key parameters from the various implements 14. For instance, the implement identification process can be automated (e.g., key parameters are obtained by the power unit 12 from sensors on the implement 14 or supplied by an overall farm management software system that is directing the autonomous power unit 12 to conduct operations). In some such embodiments, the sensors on the implement 14 may be configured to transmit the key parameters to the power unit 12 in real time, such that the power unit can adjust operation of the implement 14 during real-time agricultural operations, as necessary. Alternatively, the key parameters can be manually input through a portable electronic device with user interface that communicates with the power unit 12 and/or the implements 14 through various methods, such as wired or wireless communication (e.g., cellular, WiFi, Bluetooth, etc.). In further alternatives, the power unit 12 may include communication elements (e.g., as part of the control system 18), which is configured to obtain the key parameter from the implement 14. Such communication element may be wired or wireless (e.g., cellular, WiFi, Bluetooth, etc.). Such a communication element may comprise a scanning device, such as an optical scanner or an electromagnetic scanner (e.g., a QR Code reader, RFID tag reader, etc.), which can automatically obtain the key parameters from the implement.

Such key parameters may include information related to whether the implement 25 is: (i) towed, (ii) pushed, (iii) fully mounted without power unit weight transfer, (iv) fully mounted with power unit weight transfer, and/or (v) towed/pushed or mounted with implement providing at least some inherent tractive power. Other key parameters may include information such as general type of implement 14, type of steering operation, location of center of load, width, length of the implement 14, tire size, tire location, and/or listing/location of any tractive power elements of the implement 14. Further details, such as locations of operating elements of the implement 14 (e.g., tillage points or spraying nozzles) may also be provided to the power unit 12 as key parameters. Such parameters can be used by the autonomous power unit 12 to determine modes of operation and/or to properly control the coupling assembly 16. The key parameters may also be used for guidance, steering and proper location of field processes such as planting without overlap or skips.

In view of the above, embodiments of the present invention may include a method for operating an autonomous agricultural system 10. Such a method may include a step of providing an implement 14 configured to perform agricultural operations. An additional step may include providing a power unit 12 configured to automatically control the implement 14. An additional step may include causing the power unit 12 to obtain key parameters of the implement 14. An additional step may include coupling the implement 14 to the power unit 12. A further step may include autonomously performing agricultural operations with the power unit 12 and the implement 14 based, at least in part, on the obtained key parameters.

As was noted above, the autonomous agricultural system 10 may include a control system 18 that permits the components of the autonomous agricultural system 10 (e.g., the power units 12, implements 14, and/or coupling assemblies 16) to operate autonomously, such as via satellite-based geo-positioning (e.g., via GPS), radio-frequency positioning (e.g., cellular triangulation), vision-based sensors, or the like, and/or combinations thereof.

In more detail, the autonomous agricultural system 10 may include a control system 18 that receives inputs/data from various sensors and controls operation of the autonomous agricultural system 10 based on such inputs/data. As will be described in more detail below, the control system 18 may control operation of the power units 12 (e.g., via speed/directional control of the drive mechanisms 28, as well as the coupling assemblies 16 in the form of twin-pivot articulated hitches 50) and the implements 14 (e.g., via coupling assemblies 16 in the form of five or six-actuator couplers 30, 40). Such control of the coupling systems 16 and the drive mechanisms 28 may be performed by the control system 18 simultaneously and independently. The sensors may include location-determining elements (e.g., global positioning sensors/receivers ("GPS"), global navigation signal system ("GNSS"), real time kinematics (RTK), over-the-air, broadband, wide area network ("WAN"), local area network ("LAN"), etc.), vision-based sensors (e.g., video cameras, infrared (IR) cameras, LIDAR, RADAR, etc.), temperature sensors, moisture sensors, pressure sensors, position sensors, sonic sensors (e.g., ultrasonic sensors), and the like.

In more detail, each of the actuators of the coupling assemblies 16 of the autonomous agricultural system 10

(e.g., of the twin-articulated hitch 50 and the six-actuator coupler 40, as well as perhaps the five-actuator coupler 30) may be associated with a position sensor in communication with the control system 18. The positions sensors may provide real-time feedback to the control system 18 as to the positions of the actuators. As such, the control system 18 can verify and control the position of the actuators in real time, as well as correspondingly verify and control the position and orientation of the power units 12, the implements 14, and/or the coupling assemblies 16 in real time. As discussed above, the position sensors may comprise pressure sensors, optical sensors (e.g., laser sensors), mechanical or electromechanical sensors (rotary encoders, switches, etc.), accelerometers (e.g., tilt/inclination/height sensors), magnetic sensors (e.g., Hall effect sensors), sonic sensors (e.g., ultrasonic sensors), or the like, which are configured to measure real-time positions of the actuators and/or components of the coupling assemblies 16. Such positions sensors may, for instance, be configured to obtain information indicative of the extension/retraction amount of the actuators (e.g., hydraulic cylinders), as well as spatial orientation of the actuators.

For example, as discussed in more detail below, each of the actuators associated with the coupling assemblies 16 may include a position sensor, such that the control system 18 can monitor and control, in real time, the precise position and orientation of the links and actuators of the coupling assemblies 16, as well as the position and orientation of the power units 12 and the implements 14 supported by the coupling assemblies 16. For example, with respect to the twin-pivot articulated hitch 50, each of the yaw actuators 50b of the twin-articulated hitch 50 may include a position sensor configured to provide an indication of the real-time position of the respective yaw actuator 50b. The yaw actuator sensors may be configured to make relative measurements of components of the twin-articulated hitch 50 with respect to the two yaw axes "y1" and "y2." In addition, the roll plates 50a of the twin-articulated hitch may include one or more sensors configured to sense the relative positions of the roll plates 50a of the twin-articulated hitch 50. As such, these sensors may be configured to make relative measurements of components of the twin-articulated hitch 50 with respect to the roll axis "r1." Furthermore, the pitch connection of the twin-articulated hitch 50 may include one or more sensors configured to sense the relative positions of the halves of the twin-articulated hitch 50. As such, these sensors may be configured to make relative measurements of components of the twin-articulated hitch 50 with respect to the pitch axis "p1." In view of the above, the twin-articulated hitch 50 may include position sensors in, on, or otherwise associated with each actuator of the twin-articulated hitch 50, so as to determine location and orientation of the twin-articulated hitch 50 and/or of the power units 12 interconnected via the twin-pivot articulated hitch 50. Similarly, as described more below, the six-actuator coupler 40 may include sensors on each of the actuators and various other components of the six-actuator coupler 40, so as to determine location and orientation of the six-actuator coupler 40. Based on such determination, the control system 18 may control the actuators as needed for appropriate operation of the autonomous agricultural system 10.

In some embodiments, the twin-pivot articulated hitch 50 may also include one or more rotation/angle sensors for monitoring relative angular positions of components of the twin-articulated hitch 50. For example, the twin-articulated hitch 50 may include rotation/angle sensors on each of the front and rear portions of the twin-articulated hitch 50 (e.g., to monitor angular displacement of the twin-articulated hitch 50 with respect to the two yaw axes "y1" and "y2") in order to provide feedback of turning angle for the power units 12. The twin-articulated hitch 50 may also include rotation/ angle sensors on the roll pivot joint (e.g., to monitor angular displacement of the twin-articulated hitch with respect to the roll axis "r1"), and on the pitch angle joint (e.g., to monitor angular displacement of the twin-articulated hitch 50 with respect to the pitch axis "p1"). The above-described sensors associated with the twin-articulated hitch 50, as well as the six-actuator coupler 40 described in more detail below, may be in constant (or near constant) communication with the control system 18 to provide real-time feedback to the control system 18 for use in real-time steering, tractive power distribution, and implement 14 control operations of the system 10.

Turning in more detail to the six-actuator coupler 40 (as well as to the five-actuator coupler 30), each actuator of the six-actuator coupler 40 may also be configured to include a position sensor. For example, each of the actuators associated with the right and left lower links 40a, 40b, the right and left vertical lift actuators 40d, 40e, as well as the right and left upper links 40c(i), 40c(ii), may include position sensors. As such, the position sensors can provide real-time feedback as to the position and orientation of the implement 14 of the autonomous agricultural system 10. Based on such feedback, the control system 18 can provide real-time control of the six-actuator coupler 40, so as to accurately control the position/orientation of the implement 14. In view of the above, the six-actuator coupler 40 may include position sensors in, on, or otherwise associated with each actuator (e.g., hydraulic cylinder), as well as other components of the six-actuator coupler 40, so as to determine and control the location and orientation of the six-actuator coupler 40 and the associated implement 14. As will be described in more detail below, the above-described sensors may be in constant (or near constant) communication with the control system 18 to provide real-time feedback to the control system 18 for use in controlling the position/orientation and power distribution for the implement 14 in real-time.

Each of the above-described position sensors of the coupling assemblies 16 (e.g., associated with the twin-articulated hitch 50 and/or the six-actuator coupler 40) may be communicatively coupled with the control system 18, such that the control system can obtain real time position and orientation information for the twin-articulated hitch 40 and/or six-actuator coupler 40. Based on such information, the control system 18 may control the power units 12 and/or the implements 14 in real-time, as required for proper operations (as discussed in more detail below).

In addition to the above sensors, the autonomous agricultural system 10 may include height sensors on the implement 14 configured to monitor real-time height and levelness of the implement 14 (e.g., relative to the ground or soil). In some embodiments, the implement 14 will include height sensors (e.g., positions sensors configured to measure a distance above the ground) at three or more locations so as to provide accurate measurements of implement 14 height and orientation. Based on such measurements from the sensors, the control system 18 can control the six-actuator coupler 40 by extending and/or retracting appropriate actuators to obtain desired implement 14 position, in real time, relative to field surface, independently of the power units' 12 position and/or relative orientation.

In addition, one or more of the power units 12 and/or the implements 14 may include one or more inclination/tilt sensors (e.g., magnetometers and/or accelerometers) configured to measure a real-time inclination/orientation of the power units 12 and/or the implements 14 with respect to a horizontal or vertical direction (e.g., a gravitational force direction). Furthermore, one or more of the power units 12 and/or the implements 14 may include one or more vision-based sensors for obtaining visual information of terrain, vegetation, obstacles, or other elements around the autonomous agricultural system 10. Alternatively, or in addition, one or more of the power units 12 and/or the implements 14 may include one or more GPS receivers configured to sense a rea-time geolocation of the power units 12 and/or implements 14. Regardless, each of the above-described sensors may be in real-time communication with the control system 18, such that the control system 18 can control the real-time movement and positioning of the power unit(s) 12, the implement(s) 14, and/or the coupling assemblies 16 of the autonomous agricultural system 10. For example, based on information received from the sensors (or other information input into the control system 18) the control system 18 may be configured to autonomously select and operate the power unit(s) 12 in various steering modes, such as a single power unit skid-steer steering (see, e.g., FIG. 17 which uses a single power unit 12 and a portion, i.e., one-half, of a twin-pivot articulated hitch 50 to support an implement (not shown)), two power units connected via a twin-pivot articulated hitch 50 but using a single pivot angle steering (see, e.g., FIG. 21 illustrating the twin-pivot articulated hitch 50 only being pivotable about one yaw axis "y1"), and two power units using connected via a twin-pivot articulated hitch 50 and using twin pivot angle steering (see, e.g., FIG. 22 illustrating the twin-pivot articulated hitch 50 being pivotable about both yaw axes "y1" and "y2") such as may be used for crab steering.

In more detail, the control system 18 may analyze various information, to determine the proper control and/or steering mode of the autonomous agricultural system 10. For instance, the control system 18 may implement single power unit skid-steer steering when the control system 18 determines that only a single power unit 12 is being used. Alternatively, the control system 18 may implement single or twin pivot steering (e.g., crab steering) when the control system 18 determines that multiple power units 12 are being used. To determine whether single or twin pivot steering (e.g., crab steering) should be used, the control system 18 may analyze the desired path of the autonomous agricultural system 10 (e.g., based on terrain maps stored on the control system 18, based on path/plan information input by an operator, and/or based on information received from the sensors) and decide which steering method will be the most effective while running over the least amount of crop rows.

For example, a desired path plan for the autonomous agricultural system 10 and an amount of row overrun may be used as inputs, as well as to the control system 18 for determining whether the twin-pivot articulated hitch 50 should function (i) with a single pivot (i.e., only the yaw actuators 40b of a portion, namely one-half, of the twin-pivot articulated hitch 50 associated with a single power unit 12 are configured to actuate about a single yaw axis "y1" or "y2"), (ii) with twin pivots (i.e., all the yaw actuators 40b of the twin-pivot articulated hitch 50, namely, both portions of the twin-pivot articulated hitch 50 associated with both power units 12, are configured to actuate about both yaw axes "y1" and "y2") having inwards rotation about both yaw axes (see FIGS. 18 and 22), or (iii) with twin pivots (i.e., all the yaw actuators 40b of the twin-pivot articulated hitch 50, namely, both portions associated with both power units 12, are configured to actuate both yaw axes "y1" and "y2") with outwards rotation about both yaw axes (see FIG. 23) such that the portions of the twin-pivot articulated hitch 50 are "offset" which may be used for crab steering. During operation, real-time position sensor information discussed above can be provided as feedback inputs to the control system 18 to maintain proper operation and control of the power units 12, the implements 14, and/or the coupling assemblies 16.

Similarly, a desired path plan for the autonomous agricultural system 10 and an amount of row overrun may be used as inputs to the control system 18 for determining whether the twin-articulated hitch 50 should function with matching front and rear steering angles (i.e., defined with respect to rotation about the first and second yaw axes, "y1" and "y2" respectively) or unmatched front and rear steering angles. For example, a potential amount of row overrun used as input in decision whether to conventional steer (i.e., inwards rotation about both yaw axes "y1" and "y2") or crab steer (i.e., outward rotation about both yaw axes "y1" and "y2"). In some embodiments, incline sensors may also be used as inputs for the control system 18 to determine whether to conventional steer or crab steer. During operation, real-time position sensor information discussed above can be provided as feedback inputs to the control system 18 to maintain proper operation and control of the power units 12, the implements 14, and/or the coupling assemblies 16.

Furthermore, control of relative drive mechanism 28 speed on each power unit 12 (e.g., as determined by speed sensors) combined with control of twin-articulated hitch 50 steering angles (i.e., as measured with respect to rotation about the first and second yaw axes) to achieve desired steering mode may be performed by the control system 18. Furthermore still, embodiments of the present invention may include a combination of the system 10 using (i) skid-steer mode steering of front unit 12, (ii) a twin-articulated hitch 50 configured to couple the front power unit 12 and the rear power unit 12 and to actuate both power units 12 about complimentary angles, and (iii) a differential speed control (e.g., a faster/slower speed) of the rear power unit 12 in order to achieve tighter turning radius of the system 10 when needed. In some embodiments, the control system 18 may control the actuation, speed, and acceleration of the actuators of the twin-articulated hitch 50. Regardless, the control system 18 will be configured to independently control operation of the drive mechanisms 28 of the power units 12 and the twin-articulated hitch. Thus, the control system 18 can simultaneously control each of the connection assemblies 16 and the drive mechanisms 28 of the system. For example, given the autonomous agricultural system of FIG. 23, the control system 18 can independently and simultaneously control (i) the six-actuator coupler 40 associated with the front power unit 12 to control the position of the front implement 14, (ii) the six-actuator coupler 40 associated with the rear power unit 12 to control the position of the rear implement 14, (iii) the twin-pivot articulated hitch 50 to control the position and steering of the power units 12 and/or the overall system 19, and (iv) the drive mechanisms 28 on each of the power units 12. As such, the control system 18 is configured to independently and simultaneously (i) steer the autonomous agricultural system 10 via control of the coupling assemblies 16 and said drive mechanisms 28, and (ii) position the implement 14 via control of the coupling assemblies 16.

Turning to control of the implement 14 via the six-actuator coupler 40, the actuation, speed, and acceleration of the six-actuator coupler 40 actuators may be controlled by the control system 18 based at least in part on physical characteristics of the implement 14, such as operating width, weight, center of gravity location of the implement 14. Regardless, the control system 18 can constantly monitor the positions of the actuators based on the real-time position sensor feedback, and control the actuators to maintain intended position/orientation of the implement 14. In addition, an implement 14 height target above ground set at least in part by quality of operating performance measured after an implement 14 pass. The quality determination may be made by the control system 18 upon receiving visual information of the soil and/or vegetation from the vision-based sensors associated with the autonomous control system 10 after completing an implement 01 pass. The height sensors and/or inclination sensors may be used to adjust the position/orientation of the implement 14 to maintain consistency with the target. Regardless, the control system 18 is configured to control the position of the implement 14 (via the six-actuator coupler 50) independently of the position of the power units 12.

In addition, vision-based sensors may be used as inputs for the control system 18 to control for yaw angle movement of the implement 14. Vision-based sensors may also be used as inputs for the control system 18 to control for left/right movement of the implement 14. Alternatively, or in addition, an "As planted" GPS map generated by and stored on the control system 18, as well as geolocation of the implement 14 as determined by the GPS receiver, may be used as inputs for the control system 29 to control for yaw angle movement of the implement. Similarly, an "As planted" GPS map generated by and stored on the control system 18, as well as geolocation of the implement 14 as determined by the GPS receiver, may also be used as inputs for the control system 18 to control for left/right movement of the implement 18.

Although the invention has been described with reference to the one or more embodiments illustrated in the figures, it is understood that equivalents may be employed and substitutions made herein without departing from the scope of the invention as recited in the claims.

What is claimed is:

1. An autonomous agricultural system comprising:
    an implement configured to perform an agricultural operation;
    an autonomous power unit for autonomously propelling said implement; and
    a coupling assembly configured to connect said implement to said power unit, wherein said coupling assembly provides at least six degrees of freedom of movement between said implement and said power unit
    wherein said coupling assembly comprises—
        at least one upper actuator,
        a lower left actuator and an intermediate left actuator, wherein the intermediate left actuator is positioned vertically between the upper actuator and the lower left actuator,
        a right lower actuator and an intermediate right actuator, wherein the intermediate right actuator is positioned vertically between the upper actuator and the lower right actuator,
        a left telescopic link positioned vertically between the intermediate left actuator and the lower left actuator, and
        a right telescopic link positioned vertically between the intermediate right actuator and the lower right actuator.

2. The autonomous agricultural system of claim 1, wherein said coupling assembly provides at least six degrees of freedom via at least six controllable actuators.

3. The autonomous agricultural system of claim 2, wherein said actuators comprise hydraulic cylinders.

4. The autonomous agricultural system of claim 2, further comprising a control system for controlling said actuators, wherein said control system comprises sensors configured to obtain information indicative of a position of each of said actuators.

5. The autonomous agricultural system of claim 1, wherein said coupling assembly is configured to control movement of said implement by controlling a vertical translation, a lateral translation, a longitudinal translation, a rotation about a vertical yaw axis, a rotation about a longitudinal roll axis, and a rotation about a lateral tilt axis of said implement.

6. The autonomous agricultural system of claim 1, wherein said implement is a first implement and said coupling assembly is a first coupling assembly, and wherein said autonomous agricultural system further comprises—
    a second implement configured to perform an agricultural operation, and
    a second coupling assembly configured to connect said second implement to said power unit, wherein said second coupling assembly provides at least six degrees of freedom of movement between said second implement and said power unit.

7. The autonomous agricultural system of claim 6, wherein said first implement is positioned in front of said power unit and said second implement is position behind said power unit.

8. The autonomous agricultural system of claim 1, wherein said coupling assembly comprises—
    a coupler configured to be releasably secured to said implement,
    wherein the lower left and lower right actuators each extend from said power unit to a lower mount of said coupler,
    wherein the intermediate left and intermediate right actuators each extend from said power unit to one of said telescopic links or to one of said lower mounts of said coupler, and
    wherein the at least one upper actuator extends from said power unit to an upper mount of said coupler.

9. The autonomous agricultural system of claim 8, wherein said coupler comprises a three-point hitch assembly.

* * * * *